United States Patent [19]
Azuma et al.

[11] Patent Number: 5,198,736
[45] Date of Patent: Mar. 30, 1993

[54] ORTHOGONAL TWO-AXIS MOVING APPARATUS

[75] Inventors: Yusaku Azuma; Katsumi Ishihara; Takeo Tanita; Hiroyuki Kigami, all of Yokohama, Japan

[73] Assignee: Canon Kabushiki Kaisha, Tokyo, Japan

[21] Appl. No.: 791,296

[22] Filed: Nov. 13, 1991

[30] Foreign Application Priority Data

Nov. 15, 1990 [JP] Japan ............................ 2-307247
Jun. 10, 1991 [JP] Japan ............................ 3-137516
Oct. 14, 1991 [JP] Japan ............................ 3-264510

[51] Int. Cl.$^5$ ............................................ B66C 23/16
[52] U.S. Cl. ............................... 318/568.10; 318/567; 318/67; 414/749; 74/89.22; 901/17
[58] Field of Search ................... 318/560–636; 395/80–99; 901/3, 5, 7, 9, 13, 12, 15–23; 74/89.22, 89.2; 414/744 R, 749, 732, 735

[56] References Cited

U.S. PATENT DOCUMENTS

| Re. 32,414 | 5/1987 | Hutchins et al. | 901/21 X |
| 4,315,437 | 2/1982 | Etchepare et al. | 74/89.22 |
| 4,524,520 | 6/1985 | Levy | 74/89.22 X |
| 4,537,084 | 8/1985 | Passemard et al. | 74/89.22 X |
| 4,600,083 | 7/1986 | Parent et al. | 74/89.22 |
| 4,922,173 | 5/1990 | Lawler | 364/513 X |
| 4,961,213 | 10/1990 | Linhart | 378/181 |
| 5,063,334 | 11/1991 | Tanita et al. | 318/568.10 |

FOREIGN PATENT DOCUMENTS

| 61-10276 | 3/1986 | Japan . |
| 61-21799 | 5/1986 | Japan . |
| 1-188913 | 7/1989 | Japan . |
| 2-250784 | 10/1990 | Japan . |

Primary Examiner—Paul Ip
Attorney, Agent, or Firm—Fitzpatrick, Cella, Harper & Scinto

[57] ABSTRACT

A technique of this invention discloses an orthogonal two-axis moving apparatus basically adapted to move in horizontal and vertical directions. In one embodiment the apparatus includes a vertical block, a horizontal moving member movably supported on the vertical block, and a driving mechanism for moving the horizontal moving member, a driving pulley, a driven pulley, and a belt for transmitting a driving force.

13 Claims, 20 Drawing Sheets

PRIOR ART

ORTHOGONAL TWO-AXIS MOVING APPARATUS

BACKGROUND OF THE INVENTION

1. Field of the Invention

The present invention relates to an orthogonal two-axis moving apparatus capable of moving in two orthogonal directions and, more particularly, to an orthogonal two-axis moving apparatus suitable for an industrial robot structure moving (rotating) at high speed.

2. Related Background Art

An orthogonal two-axis moving apparatus in which belts are looped around a plurality of pulleys in a crossed shape is proposed by the present applicant in Japanese Patent Application No. 01-188913.

In this orthogonal two-axis moving apparatus, for example, as shown in FIG. 22, a pair of orthogonal guide members $b_1$ and $b_2$ and a pair of orthogonal guide members $c_1$ and $c_2$ are mounted to extend through a central slide block a. Slide members $d_1$, $d_2$ and $e_1$, $e_2$ reciprocal in two orthogonal directions are respectively mounted in the pairs of orthogonal guide members $b_1$ and $b_2$ and $c_1$ and $c_2$. Blocks f and g are respectively fixed on two ends of the pair of slide members $d_1$ and $d_2$, and blocks h and i are respectively fixed on two ends of the pair of slide members $e_1$ and $e_2$.

Rotatable pulleys j, k, and l are mounted on the three blocks f to h of the four blocks f to i, respectively. Four rotatable pulleys m, n, p, and g are mounted on the slide block a. A belt r, two ends of which are locked by the block i, is looped around the pulleys m to g. The pulleys j and k are driven by driving motors s and t, respectively. Upon driving of the motors s and t, the slide block a is linearly moved along the slide members $d_1$ and $d_2$, and the slide members $e_1$ and $e_2$ are linearly moved in a direction perpendicular to the extension direction of the slide members $d_1$ and $d_2$.

When this orthogonal two-axis moving apparatus is applied to an industrial robot, the slide members $d_1$ and $d_2$ stand upright, and an end effector u (shown in FIG. 23) such as a hand is attached to the distal end of the block i, thereby constituting a robot arm with two (2) degrees of freedom. In addition, if this industrial robot is to be used as a robot arm with three (3) degrees of freedom, the block g of this orthogonal two-axis moving apparatus is mounted on a rotary driving part v, as shown in FIG. 23. That is, the robot with 3 degrees of freedom generally comprises a cylindrical robot.

When the above orthogonal two-axis moving apparatus is, however, used as a cylindrical robot, in the state shown in FIG. 23, the mass of the end effector u acts on the guide members $b_1$ and $b_2$ and the slide members $d_1$ and $d_2$ serving as the vertical slide mechanism to cause torsion as a whole upon rotation of the whole of the moving apparatus by the rotary driving portion v.

In order to prevent this torsion, it is necessary that the diameter of each of the slide members $d_1$ and $d_2$ is increased or the number of slide members $d_1$ and $d_2$ is increased. These modifications, however, result in an increase in size of the apparatus.

When the end effector u is vertically moved, the slide members $e_1$ and $e_2$ and the blocks h and i are vertically moved as a whole together with the slide block a. Therefore, other members cannot be located below the blocks h and i, and a large dead space is undesirably formed to decrease the efficiency of space utilization. In addition, since the vertically moving mass is large, a driving motor torque is increased when a cylindrical arrangement is employed to move a large mass in a direction along the lines of the force of gravity. A belt as a power transmission mechanism must then have a larger thickness.

SUMMARY OF THE INVENTION

The present invention has been made in consideration of the above problems, and has as its principal object to provide an orthogonal two-axis moving apparatus capable of increasing total torsion rigidity without increasing the size of the apparatus.

It is another object of the present invention to provide an orthogonal two-axis moving apparatus having a high space factor.

It is still another object of the present invention to provide an orthogonal two-axis moving apparatus capable of transmitting a driving motor torque without increasing the thickness of the belt.

It is still another object of the present invention to provide an orthogonal two-axis moving apparatus and, more particularly, to provide brake control of the orthogonal two-axis moving apparatus including a vertical block, a horizontal moving member perpendicular to the vertical block and moved in a horizontal direction, working means mounted on one end of the horizontal moving member, and means for driving a belt looped around driving and driven pulleys respectively mounted on the vertical block and the horizontal moving member to drive the horizontal moving member.

In association with the above object, there is provided brake control for preventing variations caused by the weight of the working means such as a hand finger attached to one end of the horizontal moving member.

It is still another object of the present invention to provide an orthogonal two-axis moving apparatus having the above brake control, wherein the hand finger is attached to the apparatus to constitute a robot, thereby providing a hand finger teaching function.

It is still another object of the present invention to provide an orthogonal two-axis moving apparatus having the vertical shafts $d_1$ and $d_2$ and the horizontal shafts $e_1$ and $e_2$ and the working means u, mounted at one end of each of the pair of the horizontal shafts, for performing machining or assembly of a robot hand, wherein wiring and piping operations can be improved.

In order to achieve the above objects according to an aspect of the present invention, there is provided an orthogonal two-axis moving apparatus comprising a first block, a first slide member extending along one direction and mounted on the first block to be movable along the one direction, a second block fixed on one end of the first slide member, a third block fixed to the other end of the first slide member, a second slide member extending along the other direction perpendicular to the one direction and mounted on the second block to be movable along the other direction, first and second driving rotary members pivotally supported on the first block, first and second driving motors, respectively, connected to the first and second driving rotary members to rotate the first and second driving rotary members reversibly, first and second idle rotary members pivotally mounted on two ends of the second slide member, a third idle rotary member pivotally mounted on the third block, a belt, one end and the other end of which are fixed on the second block, and an intermediate portion of which is sequentially engaged with the first idle rotary member, the first driving rotary member, the third idle rotary member, the second driving rotary member, and the second driving idle rotary member, and brake means for arbitrarily stopping rotation of the third idle rotary member wherein rotational directions of the first and second driving motors ar fixed to predetermined directions to move the second slide member in the one direction and the other direction.

According to another aspect of the present invention, there is provided an orthogonal two-axis moving apparatus comprising a first block, a first slide member extending along one direction and mounted on the first block to be movable along the one direction, a second block fixed on one end of the first slide member, a third block fixed to the other end of the first slide member, a second slide member mounted on the second block to be movable along the other direction perpendicular to the one direction, first and second driving rotary members pivotally supported on the first block, first and second driving motors, respectively, connected to the first and second driving rotary members to rotate the first and second driving rotary members reversibly, first and second idle rotary members pivotally mounted on two ends, along the other direction, of the second slide member, a third idle rotary member pivotally mounted on the third block, a belt, one end and the other end of which are fixed on the second slide member, and an intermediate portion of which is sequentially engaged with the first idle rotary member, the first driving rotary member, the third idle rotary member, the second driving rotary member, and the second idle rotary member, and brake means for arbitrarily stopping rotation of the third idle rotary member, wherein rotational directions of the first and second driving motors are fixed to predetermined directions to move the second slide member in the one direction and the other direction.

According to still another aspect of the present invention, there is provided an orthogonal two-axis moving apparatus comprising a first block, a first slide member extending along one direction and mounted on the first block to be movable along the one direction, a second block fixed on one end of the first slide member, a third block fixed to the other end of the first slide member, a second slide member extending along the other direction perpendicular to the one direction, mounted on the second block to be movable along the other direction, and having gripping means for gripping an article, first and second driving rotary members pivotally supported on the first block, first and second driving motors, respectively, connected to the first and second driving rotary members to rotate the first and second driving rotary members reversibly, first and second idle rotary members pivotally mounted on two ends of the second slide member, a third idle rotary member pivotally mounted on the third block, a belt, one end and the other end of which are fixed on the second block, and an intermediate portion of which i sequentially engaged with the first idle rotary member, the first driving rotary member, the third idle rotary member, the second driving rotary member, and the second idle rotary member, storing means for storing a teaching point of the gripping means, brake means for arbitrarily stopping rotation of the third idle rotary member, detecting means for detecting rotation amounts of the first and second driving motors, and arithmetic means for calculating a moving position of the gripping means on the basis of the rotation amounts of the first and second driving motors which are detected by the detecting means, wherein at the time of updating of the teaching point of the gripping means in the storing means, the gripping means is manually moved to a new teaching point in power-off states of the first and second driving motors, and the teaching point in the storing means is updated by an arithmetic result of the moving position by the arithmetic means.

According to still another aspect of the present invention, there is provided an orthogonal two-axis moving apparatus comprising a first block, a first slide member extending along one direction and mounted on the first block to be movable along the one direction, a second block fixed on one end of the first slide member, a third block fixed to the other end of the first slide member, a second slide member mounted on the second block to be movable along the other direction perpendicular to the one direction, and having gripping means for gripping an article, first and second driving rotary members pivotally supported on the first block, first and second driving motors, respectively, connected to the first and second driving rotary members to rotate the first and second driving rotary members reversibly, first and second idle rotary members pivotally mounted on two ends, along the other direction, of the block, a third idle rotary member pivotally mounted on the third block, a belt, one end and the other end of which are fixed on the second slide member, and an intermediate portion of which is sequentially engaged with the first idle rotary member, the first driving rotary member, the third idle rotary member, the second driving rotary member, and the second idle rotary member, and brake means for arbitrarily stopping rotation of the third idle rotary member, the apparatus further comprising detecting means for detecting rotation amounts of the first and second driving motors, and arithmetic means for calculating a moving position of the gripping means on the basis of the rotation amounts of the first and second driving motors which are detected by the detecting means, wherein at the time of updating of the teaching point of the gripping means in the storing means, the gripping means is manually moved to a new teaching point in power-off states of the first and second driving motors, and the teaching point in the storing means is updated by an arithmetic result of the moving position by the arithmetic means.

Since the orthogonal two-axis moving apparatus according to the present invention has the above arrangement, pivotal movement of the third idle rotary member pivotally mounted on the third block is regulated by the brake means. Only movement of the second slide member with respect to the second slide block is regulated, and movement of the first slide member with respect to the first slide block is allowed in power-off states of the first and second driving motors. In this manner, a manual teaching operation for the hand attached to the second slide member can be performed.

In order to achieve the third aspect of the present invention, there is provided an industrial robot comprising a lateral guide having a finger at one end thereof and movable along a lateral direction, a movable block, movable along a longitudinal direction, for laterally movably supporting the lateral guide, a mounting block extending along the longitudinal direction, guide means for movably guiding the movable block in the longitudinal direction, driving means for rotating or moving the mounting block, and wiring means for controlling to drive the finger, the wiring means having a flexible pipe for connecting an upper end of the mounting block and the other end of the lateral guide and wiring extending through the pipe along the lateral guide and connected to the finger.

In the industrial robot according to the present invention, the mounting block is hollow, and the wiring extends outside the mounting block from its lower end.

In the industrial robot according to the present invention, the lateral guide is hollow, and the wiring is inserted from the other end of the lateral guide and is connected to the finger therethrough.

BRIEF DESCRIPTION OF THE DRAWINGS

FIGS. 17 to 20 show still another embodiment of the present invention, in which

FIG. 17 is a front view thereof,

FIG. 18 is a front view showing an arrangement around a mounting block of an industrial robot shown in FIG. 17, FIG. 19 is a rear sectional view showing an internal wiring state of the industrial robot shown in FIG. 17, and FIG. 20 is a front view showing a state of a work attached to or detached from an NC milling machine by using the industrial robot shown in FIG. 17;

DESCRIPTION OF THE PREFERRED EMBODIMENTS

An arrangement of an orthogonal two-axis moving apparatus 10 according to an embodiment of the present invention will be described in detail with reference to FIGS. 1 to 9.

Figure 1:
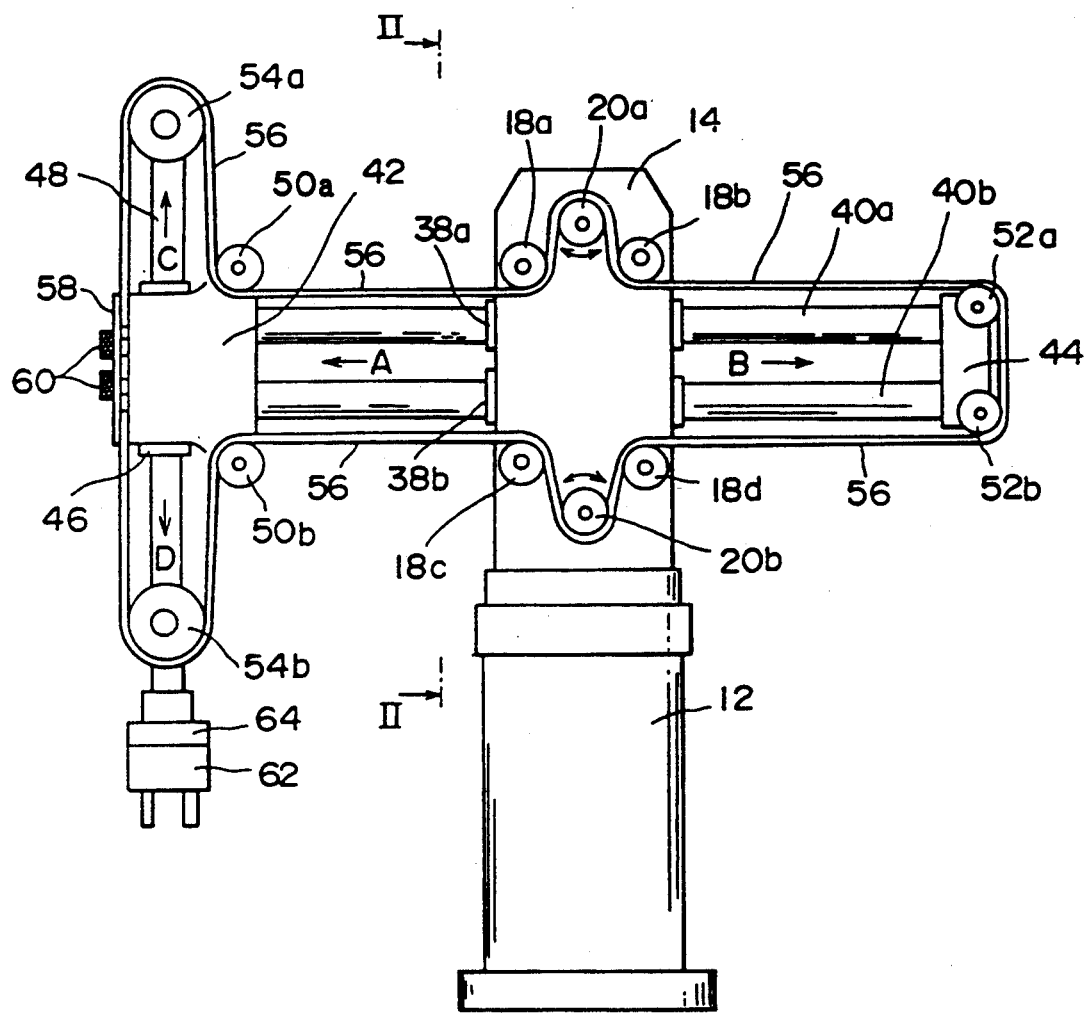
FIG. 1 is a front view showing an arrangement of an orthogonal two-axis moving apparatus according to an embodiment of the present invention.

The orthogonal two-axis moving apparatus 10 of this embodiment comprises a base 12 mounted on a foundation (not shown), as shown in FIG. 1. A vertical pivot block 14 serving as the first block is mounted on the base 12 and is pivotal about a vertical axis. The base 12 has a hollow interior. A rotary driving mechanism 16 for pivoting the pivot block 14 is stored in the base 12. The structure of the rotary driving mechanism 16 will be described later.

The pivot block 14 has a front surface extending in a direction perpendicular to a horizontal surface. Four guide rollers 18a, 18b, 18c, and 18d serving as forced engaging means and first and second driving pulleys 20a and 20b serving as the first and second driving rotary members are mounted on the front surface of the pivot block 14 and are pivotal about pivot axes normal to the front surface of the pivot block 14. The four guide rollers 18a to 18d are disposed at the four vertices of a rectangle formed by a pair of horizontal sides and a pair of vertical sides. The first driving pulley 20a is located above a hypothetical line obtained by connecting the upper pair of guide rollers 18a and 18b. Similarly, the second driving pulley 20b is located below a hypothetical line connecting the lower pair of guide rollers 18c and 18d.

Figure 2:
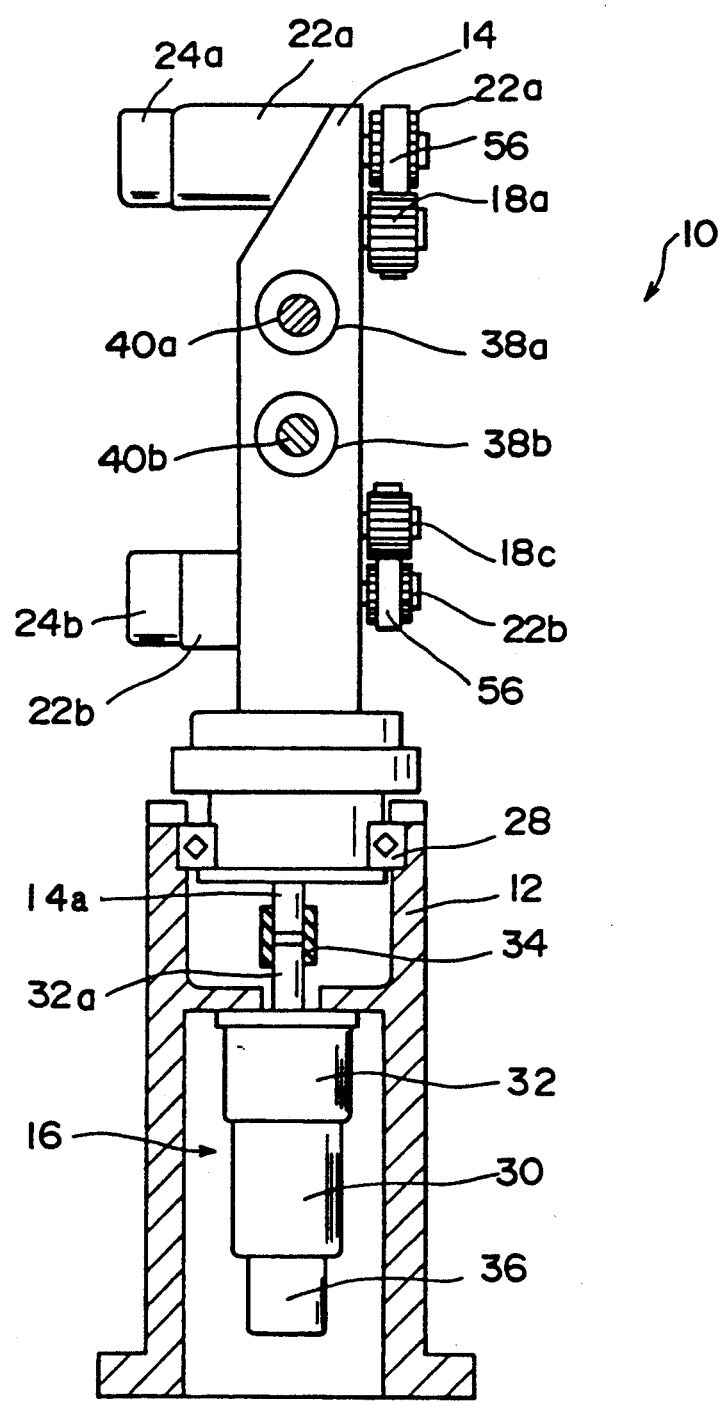
FIG. 2 is a longitudinal sectional view of the orthogonal two-axis moving apparatus of FIG. 1 along the line II—II in FIG. 1.

As shown in FIG. 2, the first and second driving pulleys 20a and 20b are connected so as to be driven by reversible driving motors 22a and 22b arranged on the rear surface of the pivot block 14. Rotary encoders 24a and 24b for detecting the rotation amounts of the driving motors 22a and 22b are connected to these motors 22a and 22b. The rotary encoders 24a and 24b are connected to a control unit 26 (to be described later) for controlling the overall two-axis moving apparatus 10, and transmit the detected rotation amount information of the corresponding driving motors 22a and 22b to the control unit 26.

As shown in FIG. 2, the base 12 comprises a hollow cylinder having an open upper end face. The lower end of the vertical pivot block 14 is pivotally supported by the upper portion of the base 12 through a bearing 28. The rotary driving mechanism 16 is incorporated in the base 12 and comprises a reversible driving motor 30 having a motor shaft (not shown) extending upward and a reduction gear mechanism 32 for decreasing a driving force of the driving motor 30 to transmit a reduced driving force to a driving shaft 32a. The driving shaft 32a is elastically connected through a coupling member 34 to a joint shaft 14a integrally extending downward at the central lower surface of the pivot block 14.

Since the rotary driving mechanism 16 has the above structure, the driving force of the driving motor 30 is reduced through the reduction gear mechanism 32, and the reduced driving force is transmitted to the driving shaft 32a, and further, to the pivot block 14 through the coupling member 34. Therefore, the pivot block 14 is rotated about its own axis.

Note that a rotary encoder 36 is connected to the driving motor 30 to detect its pivot amount. The rotary encoder 36 is connected to the control unit 26 to which rotation amount information of the driving motor 30 is transmitted.

A pair of horizontal slide guide members 38a and 38b are arranged parallel to each other and are vertically spaced apart from each other so as to horizontally extend through the pivot block 14. Horizontal slide shafts 40a and 40b serving as the first slide members are horizontally slidably supported by the horizontal slide guide members 38a and 38b, respectively. To one end of each of the horizontal slide shafts 40a and 40b, i.e., the left end, is fixed a guide block 42 serving as the second block. To the other end of each of the horizontal slide shafts 40a and 40b, i.e., the right end, is fixed a stationary block 44 serving as the third block.

A vertical slide guide 46 is arranged to extend through the guide block 42 in a vertical direction. A vertical slide shaft 48 serving as the second slide member extends in the vertical direction and is slidably supported by the vertical slide guide 46. A pair of upper and lower guide rollers 50a and 50b are pivotally supported about pivot axes normal to a front surface 42a of the guide block 42. The guide rollers 50a and 50b have substantially the same height as that of the guide rollers 18a (18b) and 18c (18d).

A pair of upper and lower idle pulleys 52a and 52b serving as third idle rotary members are pivotally supported about the pivot axes normal to the front surface of the stationary block 44. The idle pulleys 52a and 52b have the same height corresponding to the inner vertical positions of the guide rollers 18a (18b) and 18c (18d). Idle pulleys 54a and 54b serving as the first and second idle rotary members are pivotally supported on the upper and lower end faces of the vertical slide shaft 48 so as to be pivotal about pivot axes parallel to the idle pulleys 52a and 52b.

The idle pulleys 52a, 52b, 54a, and 54b and driving pulleys 20a and 20b comprise toothed pulleys each having a large number of teeth on its circumferential surface. The guide rollers 18a, 18b, 18c, 18d, 50a, and 50b comprise cylindrical rollers each having no teeth on its circumferential surface. As shown in FIG. 1, a toothed timing belt 56 is looped around the guide rollers 18a 18b 18c 18d 50a and 50b, the idle pulleys 52a, 52b, 54a, and 54b, and the driving pulleys 20a and 20b. The timing belt 56 has teeth on its inner surface, said teeth mating with the teeth of the toothed pulleys. The outer surface of the timing belt 56 is flat so that it is brought into slidable contact with the outer surface of each cylindrical roller described above.

Figure 3:
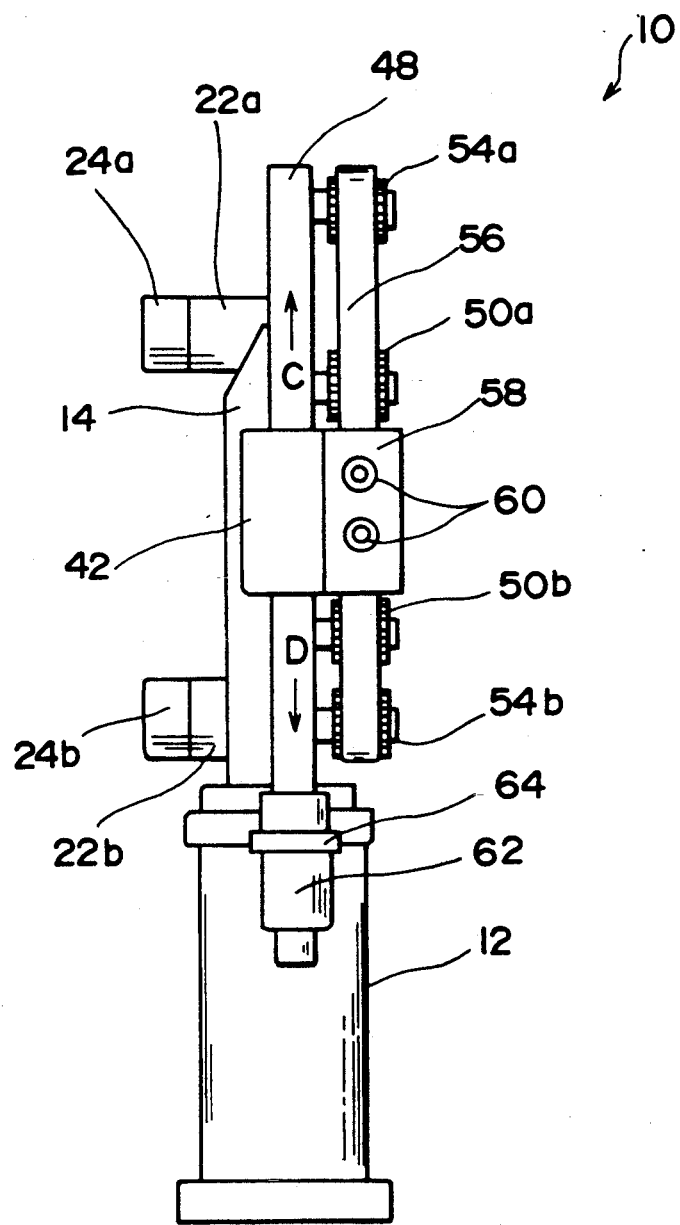
FIG. 3 is a side view showing a left side shape of the orthogonal two-axis moving apparatus shown in FIG. 1.

More specifically, one end of the timing belt 56 is fixed to the upper portion (left side surface in FIG. 1) of the guide block 42. The inner surface of the timing belt 56 is sequentially brought into slidable contact with the outer surfaces of the guide roller 50a and the guide roller 18a. The inner surface of the timing belt 56 mates with the outer surface of the driving pulley 20a, and the outer surface is brought into slidable contact with the outer surface of the guide roller 18b. The inner surface sequentially mates with the outer surfaces of the idle pulleys 52a and 52b. The outer surface is brought into slidable contact with the outer surface of the guide roller 18d. The inner surface mates with the outer surface of the driving pulley 20b, and the outer surface is sequentially brought into slidable contact with the outer surfaces of the guide rollers 18c and 50b. The inner surface mates with the outer surface of the idle pulley 54b. The other end of the timing belt 56 is then fixed to the lower end of the left side surface (FIG. 1) of the guide block 42. As shown in FIG. 3, one end and the other end of the timing belt 56 are fixed to the left side surface of the guide block 42 by mounting bolts 60 through a fixing plate 58.

As is apparent from the above description, the guide rollers 18a to 18d constituting the forced engaging means maintain a large winding angle of the timing belt 56 wound around the first and second driving pulleys 20a and 20b so as to withstand a large transmission torque. A mounting plate 64 having a hand mechanism 62 as a working means functioning as an end effector is attached to the lower end of the vertical slide shaft 48.

Figure 4:
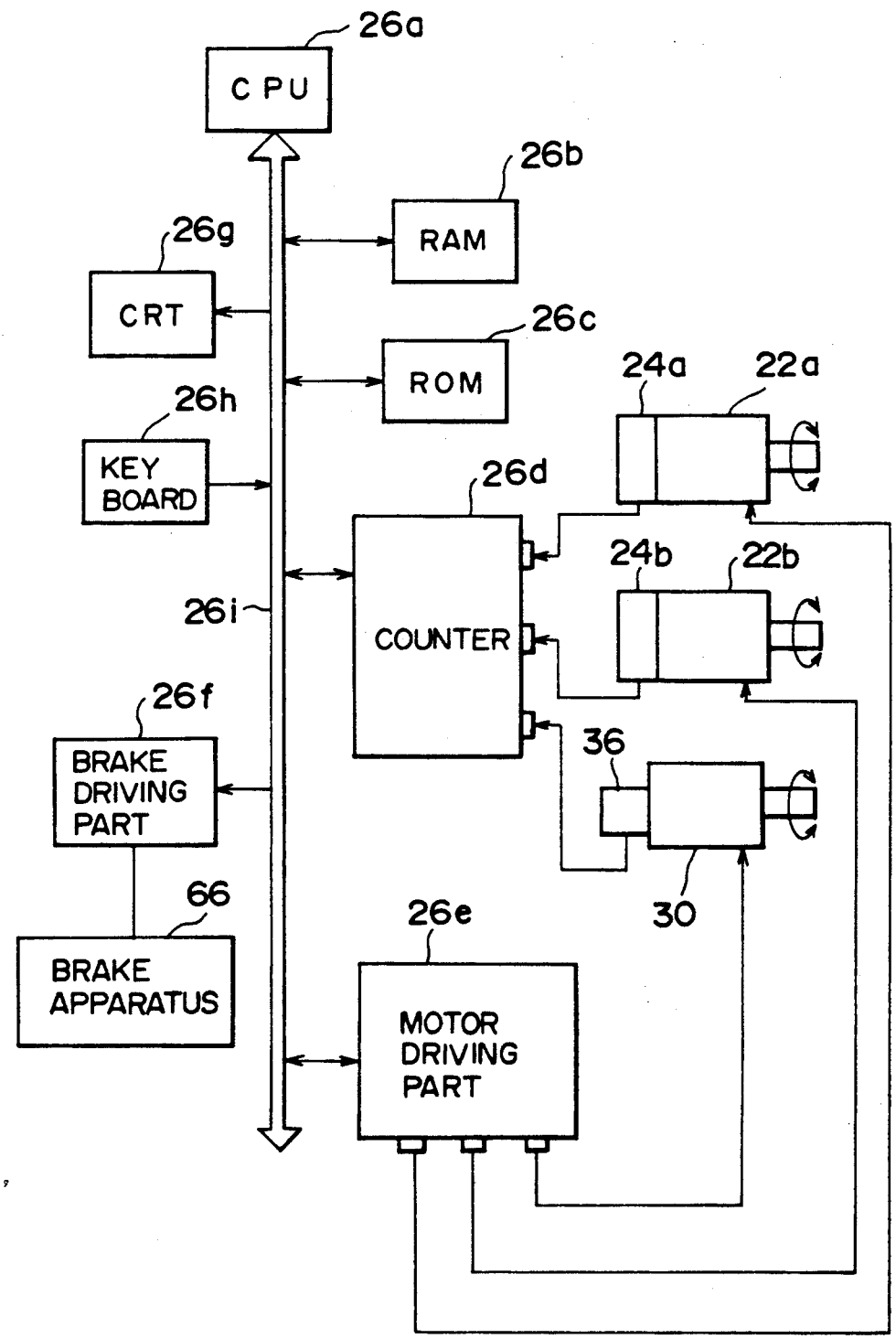
FIG. 4 is a block diagram showing an arrangement of a control system of the orthogonal two-axis moving apparatus shown in FIG. 1.

The arrangement of the control unit 26 in the orthogonal two-axis moving apparatus 10 having the above structure will be described with reference to FIG. 4.

The control unit 26 comprises: a CPU 26a having an overall control sequence for moving the hand mechanism 62 attached to the mounting plate 64 from a start position to a target position; a RAM 26b, backed up by a battery, for storing teaching point data and a robot operation program; a ROM 26c for storing a robot language translation program; a counter 26d, connected to the rotary encoders 24a, 24b, and 36 for the driving motors 22a, 22b, and 30, for measuring count value corresponding to rotation driving amounts of the driving motors 22a, 22b, and 30 to latch the count value; a motor driving part 26e for receiving the counter value information from the counter 26d, comparing the count value information with necessary counter values corresponding to necessary driving amounts of the driving motors 22a, 22b, and 30, and outputting driving signals to the driving motors 22a, 22b, and 30 by amounts corresponding to the differences output as a result of the comparison; a brake driving part 26f for controlling drive of a brake apparatus 66 (to be described later); a CRT 26g for displaying control operation states; and a keyboard 26h for manually inputting arbitrary information and data and a command. The CPU 26a is connected to the components 26b to 26h through a bus line 26i to transmit information.

A movement control operation of the hand mechanism 62 within a vertical plane in the control unit 26 will be described with reference to FIGS. 5 to 8.

As indicated by an arrow A in FIG. 1, when the hand mechanism 62 is t be moved in only the left direction, the control unit 26 causes the upper driving motor 22a to rotate counterclockwise and the lower driving motor 22b to rotate clockwise at the same speed as that of the upper driving motor 22a. As a result, the upper driving pulley 20a is rotated counterclockwise, and the lower driving pulley 20b is rotated clockwise. The upper and lower portions of the timing belt 56 are fed to the left, as indicated by the arrow A.

Figure 5:
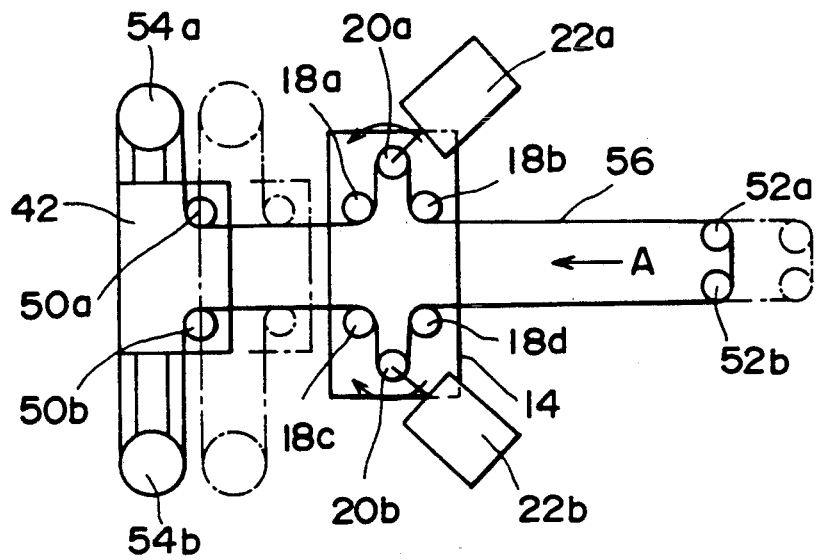
FIGS. 5 to 8 are front views sequentially showing movement control states of the orthogonal two-axis moving apparatus shown in FIG. 1.

The length of the timing belt 56 located between the guide rollers 18a and 50a and the length of the timing belt 56 located between the guide rollers 18c and 50b are increased. The length of the timing belt 56 located between the guide roller 18b and the idle pulley 52a and the length of the timing belt 56 between the guide roller 18d and the idle pulley 52b are shortened. In this manner, while rotation of the upper and lower idle pulleys 52a and 52b is inhibited, the pair of horizontal slide shafts 40a and 40b are pushed to the left from the pivot block 14. As shown in FIG. 5, the guide block 42 is moved to the left, and the hand mechanism 62 is moved to the left accordingly.

On the other hand, in order to move the hand mechanism 62 in a direction (indicated by an arrow B) opposite to the direction of the arrow A, i.e., in order to move the hand mechanism 62 to the right, the control unit 26 causes the upper driving motor 22a to rotate clockwise, and the lower driving motor 22b to rotate counterclockwise at the same speed as that of the upper driving motor 22a. As a result, the upper driving pulley 20a is rotated clockwise, and the lower driving pulley 20b is rotated counterclockwise. The upper and lower portions of the timing belt 56 are moved to the right, as indicated by the arrow B.

Figure 6:
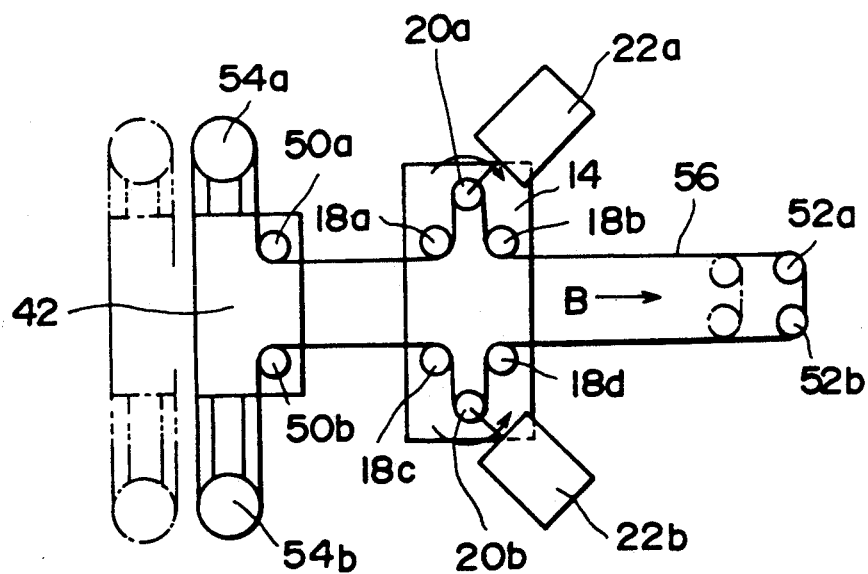

The length of the timing belt 56 located between the guide rollers 18a and 50a and the length of the timing belt 56 located between the guide rollers 18c and 50b are decreased. The length of the timing belt 56 located between the guide roller 18b and the idle pulley 52a and the length of the timing belt 56 located between the guide roller 18d and the idle pulley 52b are increased. As described above, while rotation of the upper and lower idle pulleys 52a and 52b is inhibited, the pair of horizontal slide shafts 40a and 40b are pushed to the right from the pivot block 14. As shown in FIG. 6, the guide block 42 is moved to the right. Therefore, the hand mechanism 62 is moved to the right accordingly.

As described above, in order to move the hand mechanism 62 in the direction indicated by the arrow A or B, the two driving motors 22a and 22b are rotated and driven in opposite directions. In this case, a sum of the driving forces (driving torques) of the driving motors 22a and 22b is used to drive and move the hand mechanism 62.

In order to move the hand mechanism 62 in a direction indicated by an arrow C, i.e., in an upward direction, the control unit 26 causes both the upper and lower driving motors 22a and 22b to rotate counterclockwise at the same speed. As a result, the upper and lower driving pulleys 20a and 20b are rotated counterclockwise. The upper portion of the timing belt 56 is fed to the left, as indicated by the arrow A, and the lower portion thereof is fed to the right, as indicated by the arrow B.

Figure 7:
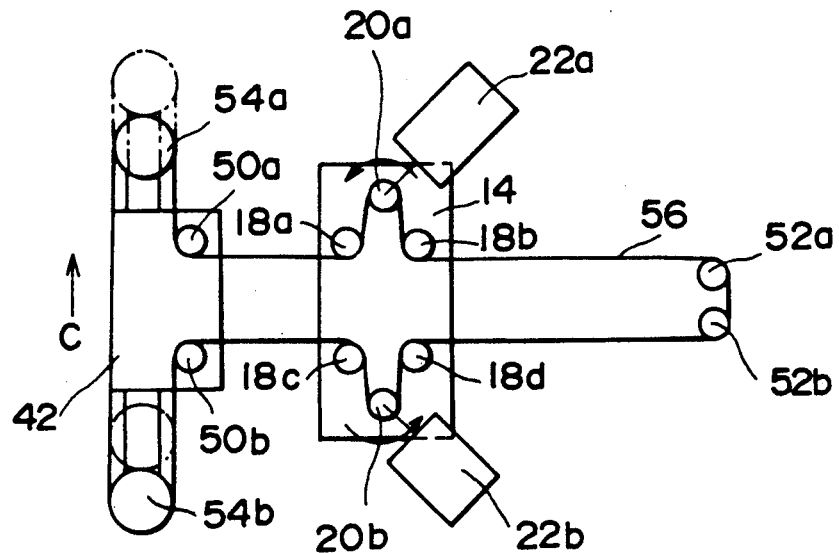

The upper idle pulley 54a is rotated counterclockwise to increase the length of the timing belt 56 between the idle pulley 54a and the guide block 42. The lower idle pulley 54b is rotated counterclockwise to decrease the length of the timing belt 56 between the idle pulley 54b and the guide block 42. As shown in FIG. 7, the vertical slide shaft 48 is moved upward from the guide block 42. Therefore, the hand mechanism 62 is moved upward.

In order to move the hand mechanism 62 in a direction indicated by an arrow D, i.e., in a downward direction, the control unit 26 causes both the upper and lower driving motors 22a and 22b to rotate clockwise at the same speed. As a result, the upper and lower driving pulleys 20a and 20b are rotated clockwise. The upper portion of the timing belt 56 is fed to the right, as indicated by the arrow B, and the lower portion thereof is fed to the left, as indicated by the arrow A.

Figure 8:
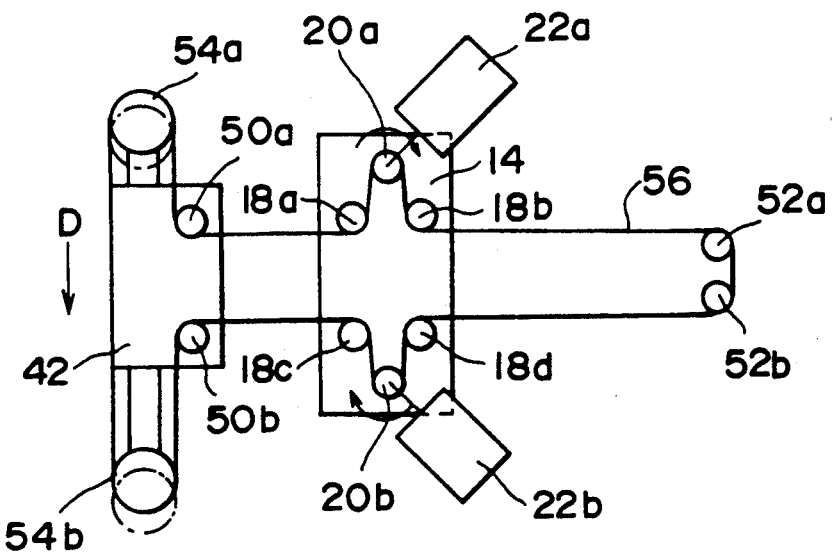

The upper idle pulley 54a is rotated clockwise to decrease the length of the timing belt 56 between the idle pulley 54a and the guide block 42. The lower idle pulley 54b is rotated clockwise to increase the length of the timing belt 56 between the idle pulley 54b and the guide block 42. As shown in FIG. 8, the vertical slide shaft 48 is moved downward from the guide block 42. Therefore, the hand mechanism 62 is moved downward.

In order to move the hand mechanism 62 in the direction indicated by the arrow C or D, the two driving motors 22a and 22b are driven in the same direction. At this time, the sum of the driving forces (driving torques) of the driving motors 22a and 22b is used to drive and move the hand mechanism 62.

Figure 9:
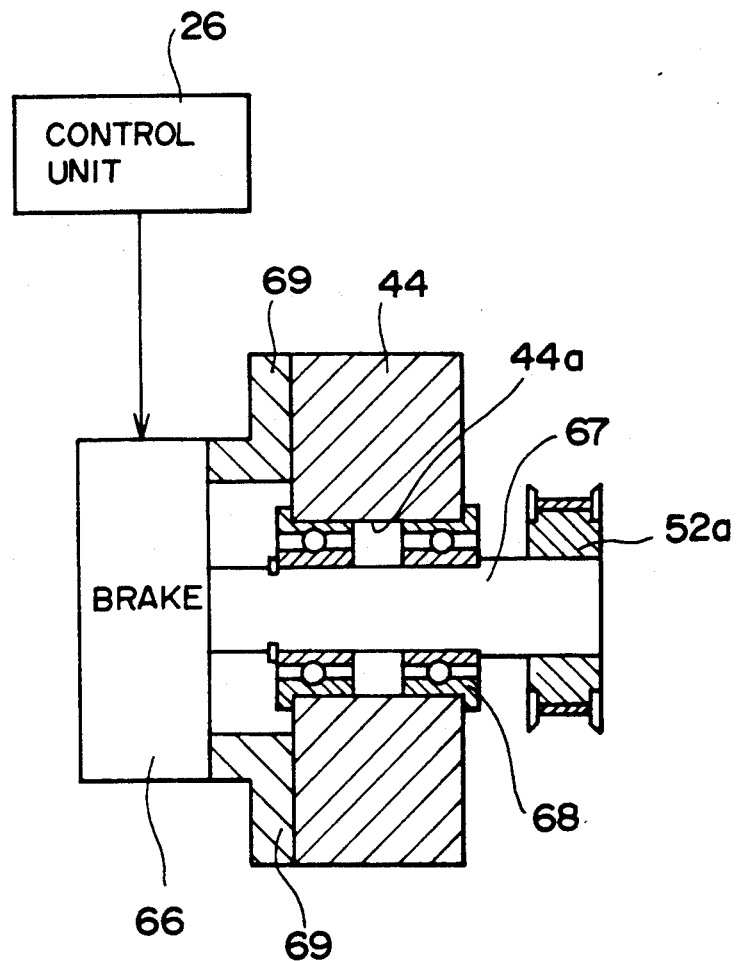
FIG. 9 is a sectional view showing a state of a brake apparatus connected to an idle pulley.

As shown in FIG. 9, the brake apparatus 66 as the characteristic feature of the present invention is mounted on one idle pulley 52a of the pair of idle pulleys 52a and 52b pivotally mounted on the stationary block 44 serving as the third block. More specifically, the idle pulley 52a is integrally coaxially mounted on one end of a pulley shaft 67, and this pulley shaft 67 is inserted through a through hole 44a formed in the stationary block 44 in the direction of the thickness thereof. The pulley shaft 67 is pivotally supported on the stationary block 44 through a bearing 68. The other end of the pulley shaft 67 extends to the read surface side of the stationary block 44.

The brake apparatus 66 is mounted on the rear surface of the stationary block 44 through a mounting stay 69. The brake apparatus 66 is connected to the other end of the pulley shaft 67. The brake apparatus 66 is also connected to the control unit 26. The brake apparatus 66 is constructed so as to regulate the rotation of the pulley shaft 67, i.e., to brake the rotation of the idle pulley 52a, under the control of the control unit 26. When the control unit 26 controls to power on the motors so as to effect the servo functions of the motors, the control unit 26 outputs an OFF signal for disabling braking of the brake apparatus 66 to the brake driving portion 26f. When the control unit 26 controls to power off the motors, the control unit outputs an ON signal for enabling braking of the brake apparatus 66.

As described above, rotation of the idle pulley 52a is inhibited by the brake apparatus 66 during the power-off time. When the first and second driving motors 22a and 22b are powered off, vertical movement of the vertical slide shaft 48 with respect to the guide block 42 is prevented, and horizontal movement of the horizontal slide shafts 40a and 40b with respect to the pivot block 14 is allowed. As described above, vertical movement of the hand mechanism 62 attached to the lower end of the vertical slide shaft 48 in the directions indicated by the arrows C and D in FIGS. 7 and 8 is inhibited. At the same time, horizontal movement of the hand mechanism 62 in the directions indicated by the arrows A and B in FIGS. 5 and 6 is allowed. Therefore, a manual teaching operation for the hand mechanism 62 can be performed. This teaching operation will be described in detail later.

When the vertical two-axis moving mechanism 10 having the above structure is mounted in a robot in practice, a so-called gate movement pattern is employed. In this movement pattern, a work placed on a table is gripped by the hand mechanism 62. The hand mechanism 62 is temporarily moved upward while it keeps gripping the work. The hand mechanism 62 is then moved to a position just above the work assembly position. The hand mechanism 62 is moved in the horizontal direction and is moved downward to the work assembly position. The hand mechanism 62 releases the work, and the work is transferred to the work assembly position. The hand mechanism 62 is moved upward again and horizontally moved to a position where the next work is to be gripped. The hand mechanism 62 is moved downward again to grip this work. In order to perform the operation in the so-called gate movement pattern described above, the vertical two-axis moving mechanism 10 is employed to move the work by the sum of the driving forces of the two driving motors 22a and 22b. As a result, even if outputs from the two driving motors 22a and 22b are set low, the work can be moved at high speed, thereby obtaining a robot capable of carrying a heavy work.

In this embodiment, a direct object to be rotated and driven by the rotary driving mechanism 16 is the pivot block 14. Even if a heavy work is rotated while being gripped by the hand mechanism 62, the pivot block 14 can have sufficiently high rigidity against torsion caused during rotary driving, thus posing no problems.

A manual teaching operation in a robot having this orthogonal two-axis moving mechanism 10 will be described in detail with reference to the block diagram of FIG. 4 and a flow chart of FIG. 10.

The teaching operation in this robot is performed as follows. The hand mechanism 62 is manually moved by an operator to a target teaching point while all the motors 22a, 22b, and 30 are powered off, thereby coarsely setting the teaching point. All the motors 22a, 22b, and 30 are powered on, and the motors 22a, 22b, and 30 are appropriately driven through the keyboard 26h to gradually move the hand mechanism 62 to the target teaching point. When the hand mechanism 62 accurately reaches the target position, this stop position is memorized or stored as teaching point data in the RAM 26b. For example, if a slight change occurs in the teaching content, a teaching point to be rewritten is not re-calculated and re-input on the keyboard 26h, but is determined such that the hand mechanism 62 is manually moved in the power-off states of all the motors 22a, 22b, and 30, and this stop position is replaced with the corresponding teaching point data, thereby rewriting the teaching point data.

Figure 10:
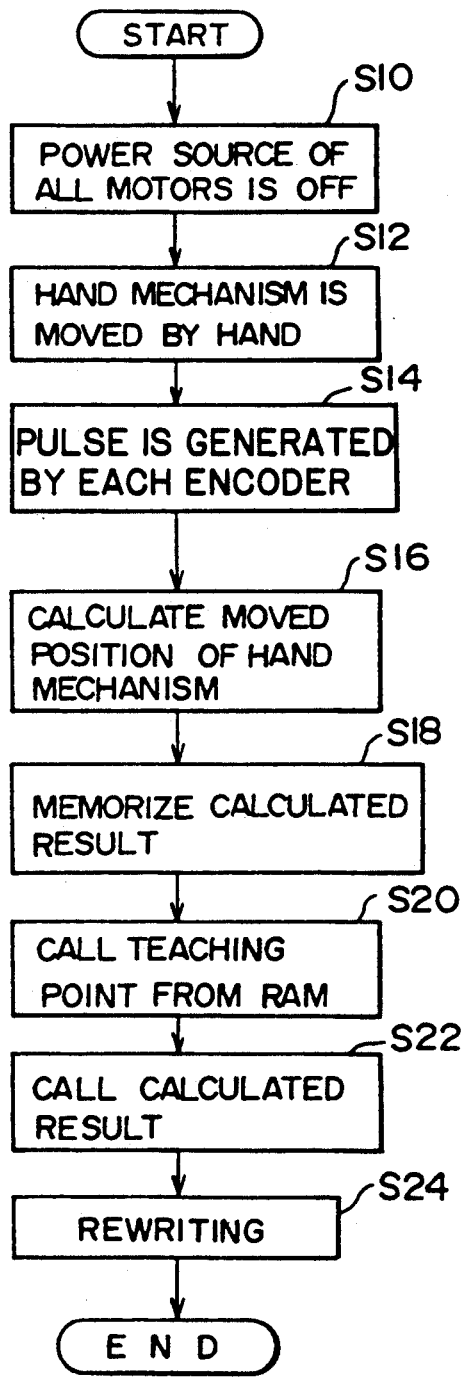
FIG. 10 is a flow chart showing an operation sequence in a teaching operation.

More specifically, as shown in FIG. 10, in step S10, all the motors 22a, 22b, and 30 are powered off. In step S12, the hand mechanism 62 is moved by hand to a target teaching point. In response to this movement of the hand mechanism 62, pulse signals are output from the encoders 24a, 24b, and 36 of all the motors 22a, 22b, and 30 to the counter 26d in step S14. In step S16, a moved position of the hand mechanism 62 is calculated on the basis of the pulse counts of the counter in the CPU 26a. The calculated result is temporarily stored in the RAM 26b in step S18. In step S20, a teaching point to be rewritten is called from the RAM 26b through the keyboard 26h. In step S22, the stop position of the hand mechanism 62 which is temporarily stored in the RAM 26b is called on the keyboard 26h. In step S24, the stop position temporarily stored as the target teaching point is rewritten. In this manner, the teaching point data is rewritten.

As described above, in the robot having the orthogonal two-axis moving mechanism 10, in order to perform a teaching operation, the hand mechanism 62 is moved in only a horizontal plane while the two motors 22a and 22b are powered off. Therefore, the manual teaching operation by the operator can be easily performed.

The present invention is not limited to the embodiment described. Various changes and modifications may be made without departing from the spirit and scope of the invention.

In the above embodiment, the hand mechanism 62 is attached to the lower end of the vertical slide shaft 48 for vertically moving the hand mechanism 62, and the vertical guide shaft 48 vertically extends from the guide block 42. However, the present invention can be put into practice by way of another embodiment described with reference to FIGS. 11 to 16.

An arrangement of an orthogonal two-axis moving apparatus according to the second embodiment of the present invention will be described with reference to FIGS. 11 to 16. The same reference numerals as in the first embodiment denote the same parts in the second embodiment, and a detailed description thereof will be omitted.

Figure 11:
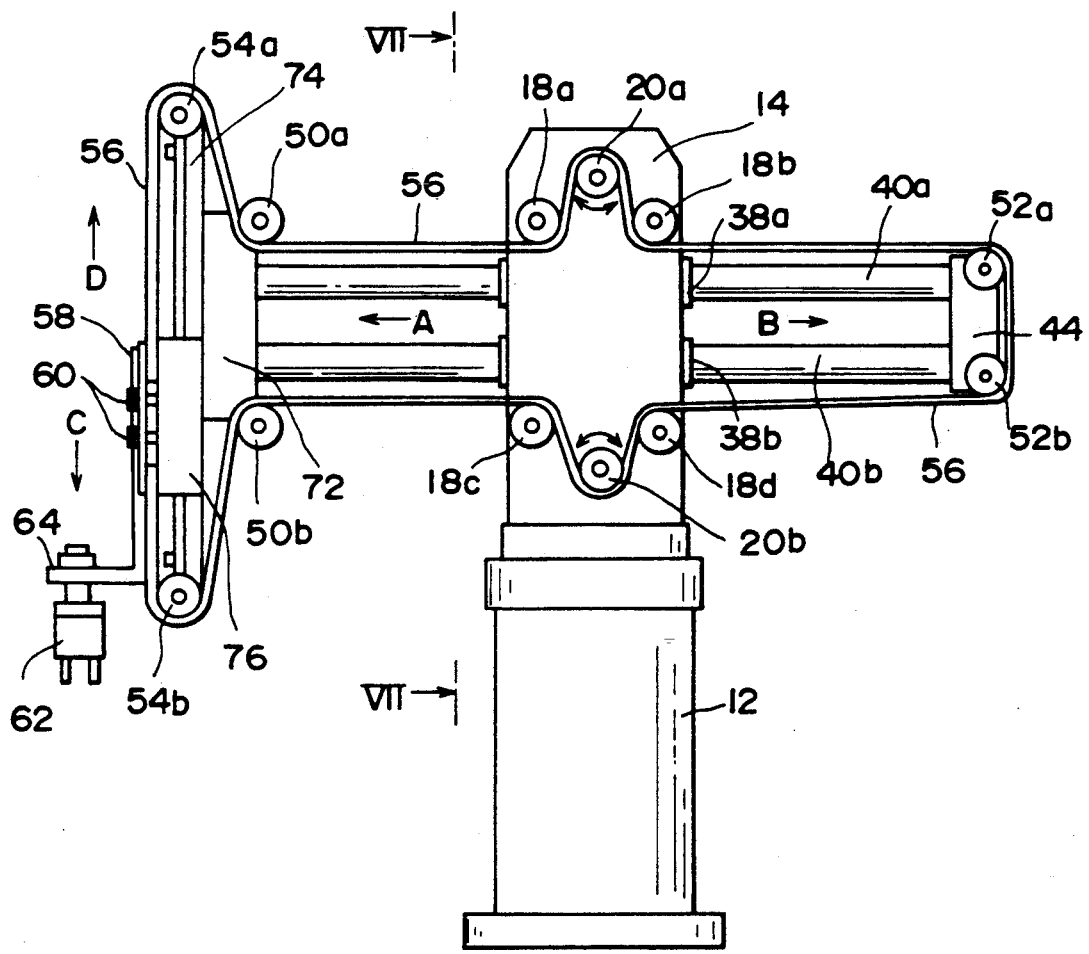
FIG. 11 is a front view showing an arrangement of an orthogonal two-axis moving apparatus according to another embodiment of the present invention.
Figure 12:
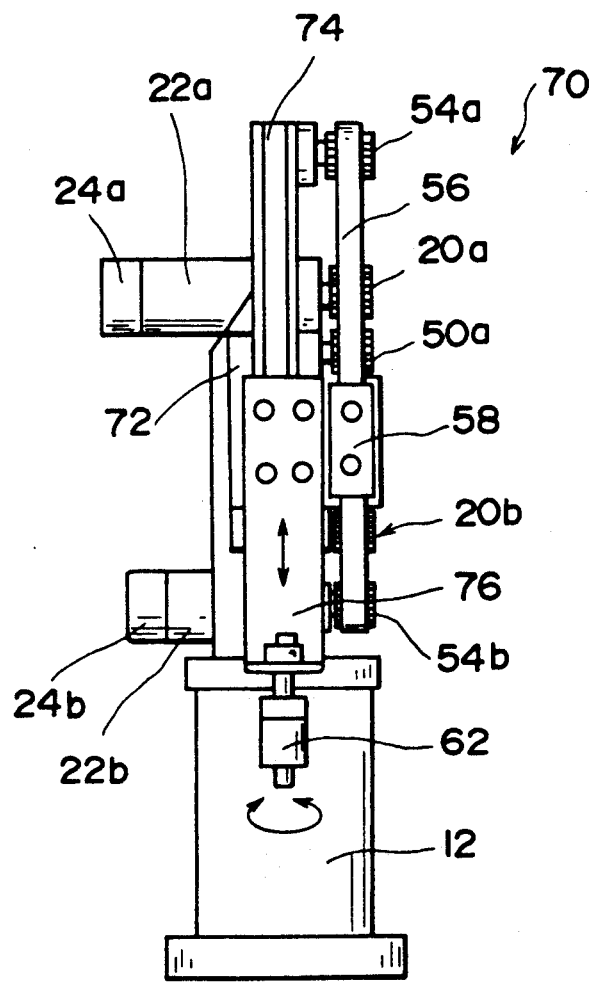
FIG. 12 is a longitudinal sectional view showing a state of the orthogonal two-axis moving apparatus of the embodiment of FIG. 11 along the line VII—VII in FIG. 11.

In the second embodiment, as shown in FIG. 11, an orthogonal two-axis moving apparatus 70 has a mounting block 72 mounted to one end, i.e., the left end of FIG. 11, of each of horizontal slide shafts 40 and 40b. A vertically extending slide guide block 74 is fixed to the left side surface of the mounting block 72. A slide member 76 is vertically and slidably mounted on the slide guide block 74.

As in the first embodiment, a pair of idle pulleys 54a and 54b are pivotally supported on the upper and lower ends of the slide guide block 74, respectively. In the second embodiment, one end of a timing belt 56 is fixed to the upper portion of the left side surface of the slide member 76, and the lower end of the timing belt 56 is fixed to the lower portion thereof. A mounting plate 64 for mounting a hand mechanism 62 is fixed on the slide member 76, as shown in FIG. 11.

A movement operation of the hand mechanism 62 of the orthogonal two-axis moving apparatus 70 in the second embodiment having the above structure will be described with reference to FIGS. 13 to 16.

In order to move the hand mechanism 62 in only the left direction, as indicated by an arrow A in FIG. 11, a control unit 26 causes an upper driving motor 22a to rotate counterclockwise and a lower driving motor 22b to rotate clockwise at the same speed as that of the upper driving motor 22a. As a result, an upper driving pulley 20a is rotated counterclockwise, and a lower driving pulley 20b is rotated clockwise. The upper and lower portions of the timing belt 56 are fed to the left as indicated by the arrow A.

Figure 13:
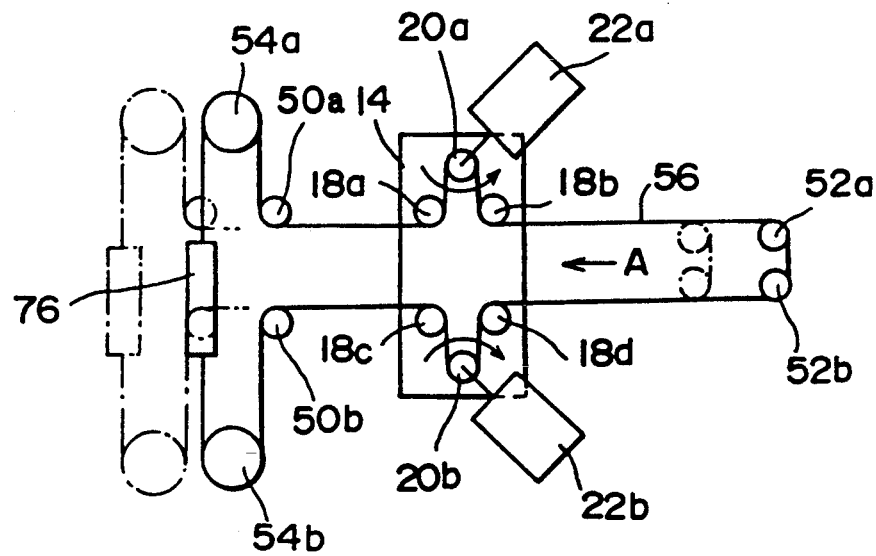
FIGS. 13 to 16 are front views showing movement control states of the orthogonal two-axis moving apparatus shown in FIG. 11.

The length of the timing belt 56 located between guide rollers 18a and 50a and the length of the timing belt 56 located between guide rollers 18c and 50b are increased. The length of the timing belt 56 located between a guide roller 18b and the idle pulley 52a and the length of the timing belt 56 between a guide roller 18d and the idle pulley 52b are shortened. In this manner, while rotation of the upper and lower idle pulleys 52a and 52b is inhibited, the pair of horizontal slide shafts 40a and 40b are pushed to the left from the pivot block 14. As shown in FIG. 13, the mounting block 72 is moved to the left, and the hand mechanism 62 mounted on the mounting block 72 through the slide member 76 is moved to the left accordingly.

On the other hand, in order to move the hand mechanism 62 in a direction (indicated by an arrow B) opposite to the direction of the arrow A, i.e., in order to move the hand mechanism 62 to the right, the control unit 26 causes the upper driving motor 22a to rotate clockwise, and the lower driving motor 22b to rotate counterclockwise at the same speed as that of the upper driving motor 22a. As a result, the upper driving pulley 20a is rotated clockwise, and the lower driving pulley 20b is rotated counterclockwise. The upper and lower portions of the timing belt 56 are moved to the right, as indicated by the arrow B.

Figure 14:
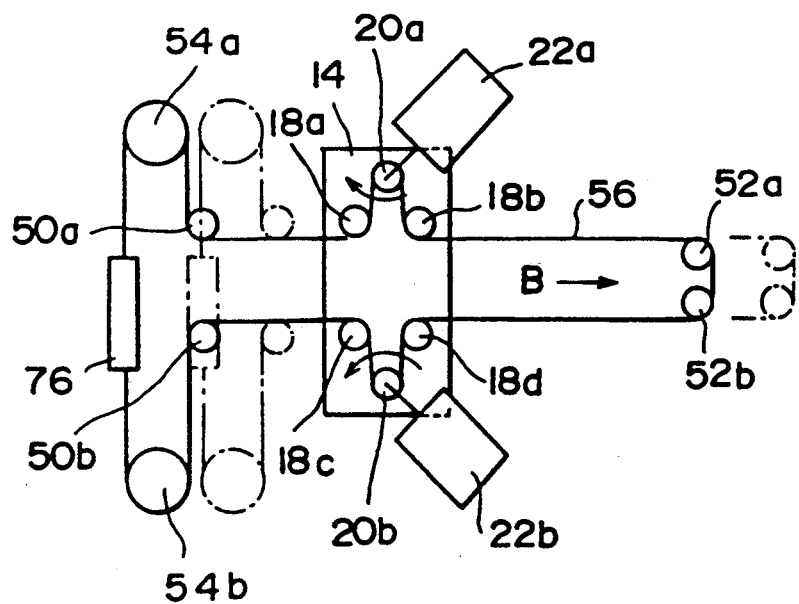

The length of the timing belt 56 located between the guide rollers 18a and 50a and the length of the timing belt 56 located between the guide rollers 18c and 50b are decreased. The length of the timing belt 56 located between the guide roller 18b and the idle pulley 52a and the length of the timing belt 56 located between the guide roller 18d and the idle pulley 52b are increased. As described above, while rotation of the upper and lower idle pulleys 54a and 54b is inhibited, the pair of horizontal slide shafts 40a and 40b are pushed to the right from the pivot block 14. As shown in FIG. 14, the mounting block 72 is moved to the right. Therefore, the hand mechanism 62 is moved to the right accordingly.

As described above, in order to move the hand mechanism 62 in the direction indicated by the arrow A or B, the two driving motors 22a and 22b are rotated and driven in opposite directions, as in the first embodiment described above. In this case, a sum of the driving forces (driving torques) of the driving motors 22a and 22b is used to drive and move the hand mechanism 62.

In order to move the hand mechanism 62 in a direction indicated by an arrow C, i.e., in an upward direction, the control unit 26 causes the upper and lower driving motors 22a and 22b to rotate clockwise at the same speed. As a result, the upper and lower driving pulleys 20a and 20b are rotated clockwise. The lower portion of the timing belt 56 is fed to the left, as indicated by the arrow A, and the upper portion thereof is fed to the right, as indicated by the arrow B.

Figure 15:
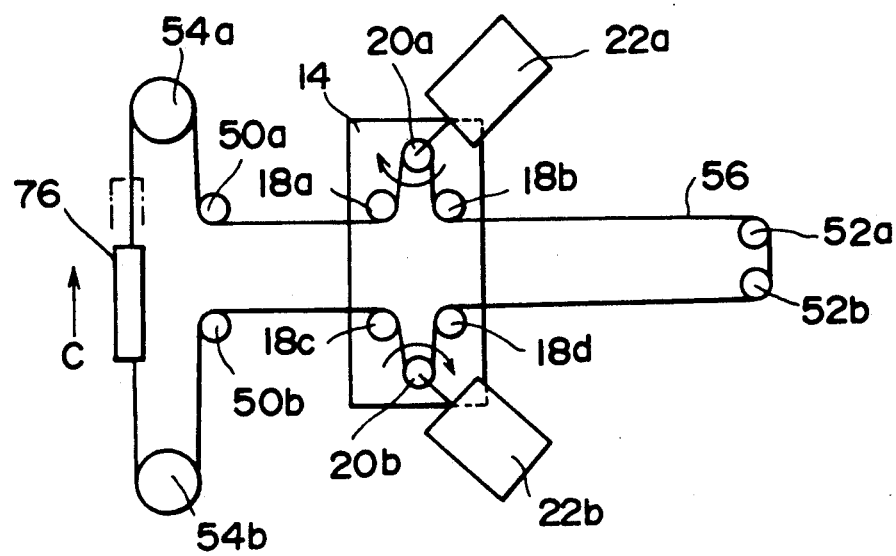

The upper idle pulley 54a is rotated clockwise to decrease the length of the timing belt 56 between the idle pulley 54a and the slide member 76. The lower idle pulley 54b is rotated clockwise to increase the length of the timing belt 56 between the idle pulley 54b and the slide member 76. As shown in FIG. 15, the slide member 76 is moved upward. Therefore, the hand mechanism 62 fixed on the slide member 76 is moved upward.

In order to move the hand mechanism 62 in a direction indicated by an arrow D, i.e., in a downward direction, the control unit 26 causes the upper and lower driving motors 22a and 22b to rotate counterclockwise at the same speed. As a result, the upper and lower driving pulleys 20a and 20b are rotated counterclockwise. The lower portion of the timing belt 56 is fed to the right, as indicated by the arrow B, and the upper portion thereof is fed to the left, as indicated by the arrow A.

Figure 16:
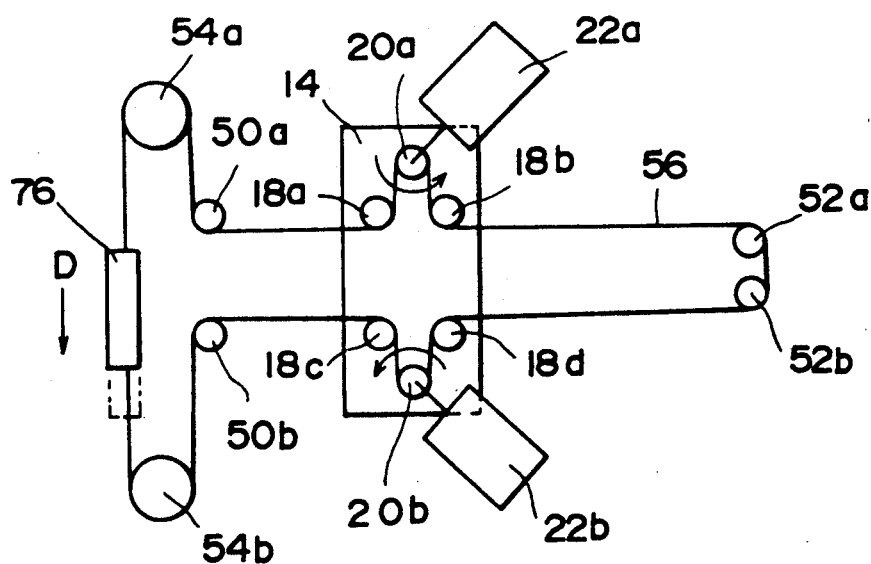

The upper idle pulley 54a is rotated counterclockwise to increase the length of the timing belt 56 between the idle pulley 54a and the slide member 76. The lower idle pulley 54b is rotated counterclockwise to decrease the length of the timing belt 56 between the idle pulley 54b and the slide member 76. As shown in FIG. 16, the slide member 76 is moved downward. Therefore, the hand mechanism 62 is moved downward.

In order to move the hand mechanism 62 in the direction indicated by the arrow C or D, the two driving motors 22a and 22b are driven in the same direction, as in the first embodiment described above. At this time, the sum of the driving forces (driving torques) of the driving motors 22a and 22b is used to drive and move the hand mechanism 62.

In the second embodiment, as in the first embodiment, the idle pulley 52a is braked by a brake apparatus 66. The brake apparatus 66 has the same effect as in the first embodiment.

In the first and second embodiments, the two idle pulleys 52a and 52b are mounted on a stationary block 44. However, the present invention is not limited to this arrangement. If an idle pulley has a large diameter, only one idle pulley 52 can be used to obtain the same operation as described above. In this case, the brake apparatus 66 is connected to the idle pulley 52 having the large diameter.

In the first and second embodiments described above, the brake apparatus 66 is connected to the idle pulley 52a. The present invention is not limited to this arrangement. The brake apparatus 66 may, of course, be connected to the idle pulley 52b.

In the above embodiment, in order to increase a winding amount of the timing belt 56 around the driving pulleys 20a and 20b, the pair of guide rollers 18a and 18b and the pair of guide rollers 18c and 18d are respectively arranged for the driving pulleys 20a and 20b, respectively. However, the present invention is not limited to the above arrangement. For example, if a transmission force is small, the guide rollers 18a, 18b, 18c, and 18d can be omitted. Even if a transmission force is large, abutment rollers, for forcibly mating the timing belt 56 with the driving pulleys 20a and 20b, are located at positions opposite to the corresponding driving pulleys 20a and 20b, so that the timing belt 56 is urged against the corresponding driving pulleys 20a and 20b, thereby obtaining the same effect as described above.

In the above embodiment, the orthogonal two-axis moving apparatus is placed on the rotary driving portion to provide a cylindrical robot, i.e., a three-axis independent robot. However, the present invention is not limited to this. For example, the apparatus may be used as an independent orthogonal two-axis moving apparatus. Alternatively, the orthogonal two-axis moving apparatus may be set to extend in the horizontal direction.

As described above, in the orthogonal two-axis moving apparatus of this embodiment, the vertically movable slide shaft 48 (first embodiment) or slide member 76 (second embodiment) is mounted at the distal ends of the horizontally movable slide shafts 40a and 40b, and the belt is looped in a T shape. The horizontal and vertical movements can be performed without placing the two driving motors 22a and 22b on the horizontal and vertical moving portions. In this manner, the overall weight of the moving portion can be reduced, and high-speed movement can be performed using a small motor.

In this embodiment, two-axis independent movement can be obtained by one timing belt 56, and a two-axis moving apparatus can be obtained at low cost.

In the above embodiment, since the hand mechanism 62 serving as an end effector and the vertical slide shaft 48 (slide member 76) are vertically moved, horizontal movement of the slide member need not be taken into consideration, and the surrounding members can be arranged freely. Since the vertical mass, to be moved along the lines of the gravitational force, comprises the hand mechanism 62 serving as an end effector and the vertical slide shaft 48 (slide member 76), high-speed movement can be performed with a small force. In addition, for example, in order to vertically move the end effector, since the two driving motors 22a and 22b are simultaneously moved in the same direction, the sum of the driving forces of these motors can be used. Therefore, the outputs from the driving motors 22a and 22b can be reduced. Similarly, in order to move the end effector in the horizontal direction, the sum of the outputs form the two driving motors 22a and 22b can also be used.

In addition, since the driving motor 30 can be arranged at the center of rotation of the base 12, an inertia force for rotating this driving motor 30 can be kept small.

By arranging a cylindrical robot using the above orthogonal two-axis moving apparatus, there is provided a high-speed robot at low cost.

Figure 23:
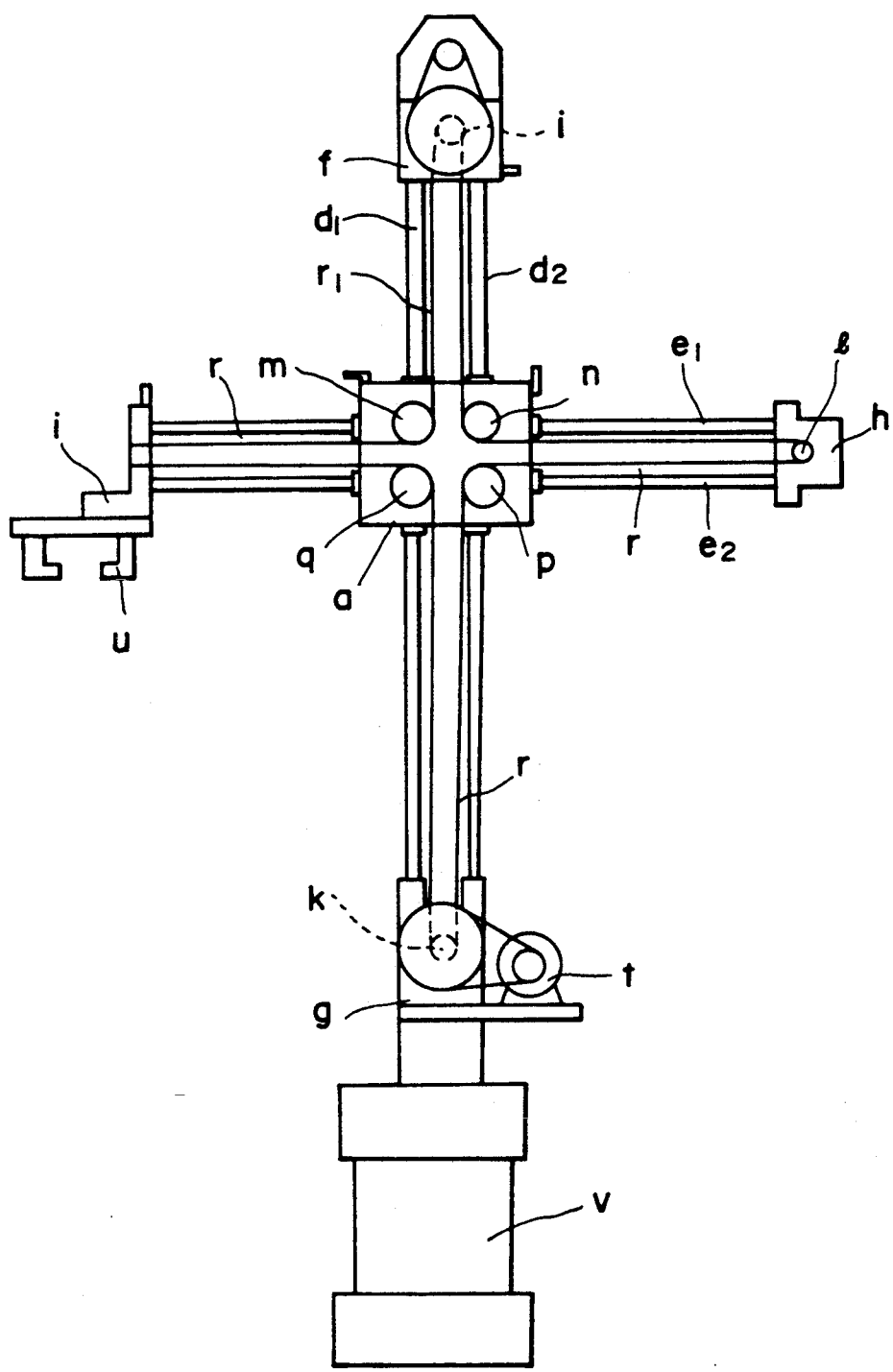

Referring to FIG. 23, during non-rotation of the slide block a by the rotary driving portion v in the conventional arrangement, vibrations are left in the end effector located at the distal end of the block i, and the robot may not function to perform an appropriate assembly operation. In this embodiment, however, the pivot block 14 is not vertically moved, unlike in the conventional arrangement, and rigidity can easily be increased. Vibrations of the end effector can easily be reduced without largely increasing the weight.

As has been described above, according to the present invention, there is provided an orthogonal two-axis moving apparatus comprising a first block, a first slide member extending along one direction and mounted on the first block to be movable along the one direction, a second block fixed on one end of the first slide member, a third block fixed to the other end of the first slide member, a second slide member extending along the other direction perpendicular to the one direction and mounted on the second block to be movable along the other direction, first and second driving rotary members pivotally supported on the first block, first and second driving motors, respectively, connected to the first and second driving rotary members to rotate the first and second driving rotary members reversibly, first and second idle rotary members pivotally mounted on two ends of the second slide member, a third idle rotary member pivotally mounted on the third block, a belt, one end and the other end of which are fixed on the second block and an intermediate portion of which is sequentially engaged with the first idle rotary member, the first driving rotary member, the third idle rotary member, the second driving rotary member, and the second driving rotary member, and brake means for arbitrarily stopping rotation of the third idle rotary member, wherein rotational directions of the first and second driving motors are fixed to predetermined directions to move the second slide member in the one direction and the other direction.

According to the present invention, there is provided an orthogonal two-axis moving apparatus comprising a first block, a first slide member extending along one direction and mounted on the first block to be movable along the one direction, a second block fixed on one end of the first slide member, a third block fixed to the other end of the first slide member, a second slide member mounted on the second block to be movable along the other direction perpendicular to the one direction, first and second driving rotary members pivotally supported on the first block, first and second driving motors, respectively, connected to the first and second driving rotary members to rotate the first and second driving rotary members reversibly, first and second idle rotary members pivotally mounted on two ends, along the other direction, of the second slide member, a third idle rotary member pivotally mounted on the third block, a belt, one end and the other end of which are fixed on the second slide member, and an intermediate portion of which is sequentially engaged with the first idle rotary member, the first driving rotary member, the third idle rotary member, the second driving rotary member, and the second idle rotary member, and brake means for arbitrarily stopping rotation of the third idle rotary member, wherein rotational directions of the first and second driving motors are fixed to predetermined directions to move the second slide member in the one direction and the other direction.

According to the present invention, there is provided an orthogonal two-axis moving apparatus comprising a first block, a first slide member extending along one direction and mounted on the first block to be movable along the one direction, a second block fixed on one end of the first slide member, a third block fixed to the other end of the first slide member, a second slide member extending along the other direction perpendicular to the one direction, mounted on the second block to be movable along the other direction, and having gripping means for gripping an article, first and second driving rotary members pivotally supported on the first block, first and second driving motors, respectively, connected to the first and second driving rotary members to rotate the first and second driving rotary members reversibly, first and second idle rotary members pivotally mounted on two ends of the second slide member, a third idle rotary member pivotally mounted on the third block, a belt, one end and the other end of which are fixed on the second block and an intermediate portion of which is sequentially engaged with the first idle rotary member, the first driving rotary member, the third idle rotary member, the second driving rotary member, and the second idle rotary member, storing means for storing a teaching point of the gripping means, brake means for arbitrarily stopping rotation of the third idle rotary member, detecting means for detecting rotation amounts of the first and second driving motors, and arithmetic means for calculating a moving position of the gripping means on the basis of the rotation amounts of the first and second driving motors which are detected by the detecting means, wherein at the time of updating of the teaching point of the gripping means in the storing means, the gripping means is manually moved to a new teaching point in power-off states of the first and second driving motors, and the teaching point in the storing means is updated by an arithmetic result of the moving position by the arithmetic means.

According to the present invention, there is provided an orthogonal two-axis moving apparatus comprising a first block, a first slide member extending along one direction and mounted on the first block to be movable along the one direction, a second block fixed on one end of the first slide member, a third block fixed to the other end of the first slide member, a second slide member mounted on the second block to be movable along the other direction perpendicular to the one direction, and having gripping means for gripping an article, first and second driving rotary members pivotally supported on the first block, first and second driving motors, respectively, connected to the first and second driving rotary members to rotate the first and second driving rotary members reversibly, first and second idle rotary members pivotally mounted on two ends, along the other direction, of the second block, a third idle rotary member pivotally mounted on the third block, a belt, one end and the other end of which are fixed on the second slide member and an intermediate portion of which is sequentially engaged with the first idle rotary member, the first driving rotary member, the third idle rotary member, the second driving rotary member, and the second idle rotary member, and brake means for arbitrarily stopping rotation of the third idle rotary member, the apparatus further comprising detecting means for detecting rotation amounts of the first and second driving motors, and arithmetic means for calculating a moving position of the gripping means on the basis of the rotation amounts of the first and second driving motors which are detected by the detecting means, wherein at the time of updating of the teaching point of the gripping means in the storing means, the gripping means is manually moved to a new teaching point in power-off states of the first and second driving motors, and the teaching point in the storing means is updated by an arithmetic result of the moving position by the arithmetic means.

According to the present invention, there is therefore provided an orthogonal two-axis moving apparatus which can be horizontally moved by an external force and cannot be vertically moved.

According to the present invention, there is also provided an orthogonal two-axis moving apparatus which enables an operator to easily perform a teaching operation.

An arrangement associated with the third aspect of the present invention will be described with reference to FIGS. 17 to 20.

Figure 17:
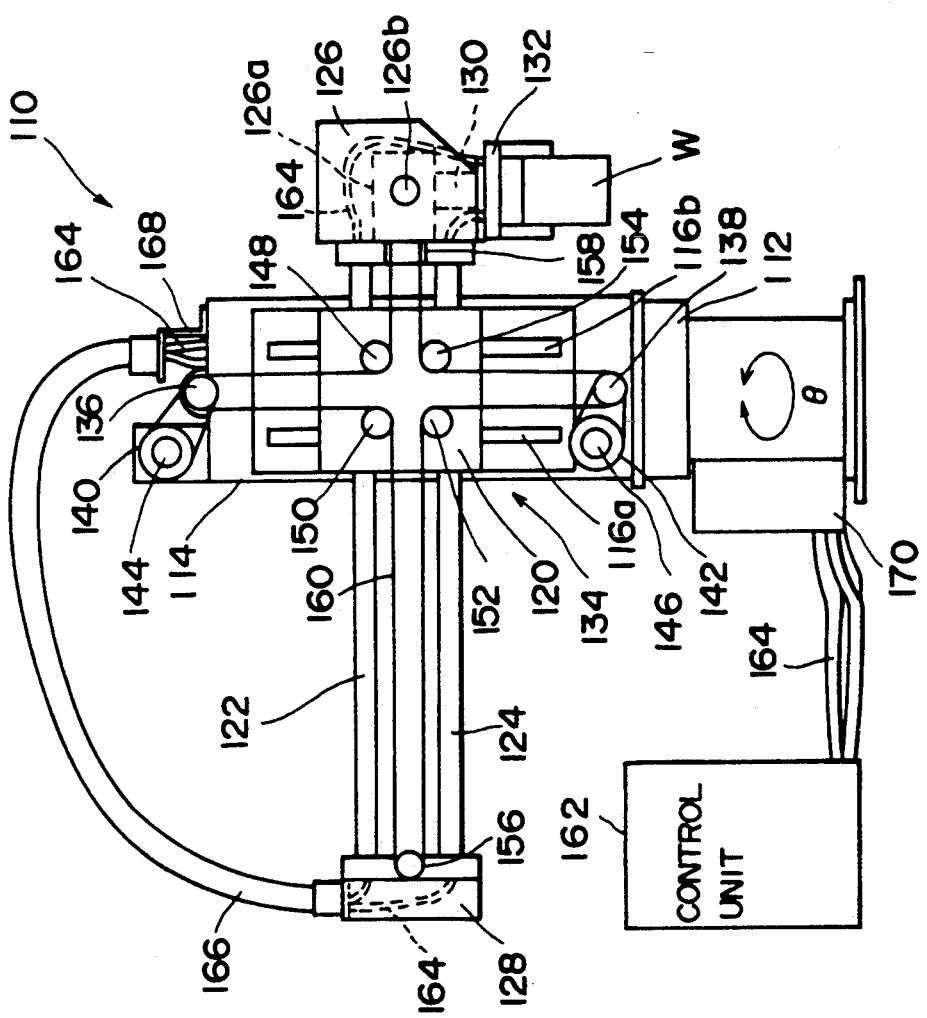

As shown in FIG. 17, an industrial robot 110 of this embodiment comprises a cylindrical robot and has a hollow cylindrical base 112 stationary in an upright state on a foundation (not shown). A vertically extending mounting block 114 is mounted on the upper end portion of the base 112. In this embodiment, the mounting block 114 is driven by a rotary driving motor (not shown) arranged in the base 112 and is rotated about a vertical axis.

Figure 18:
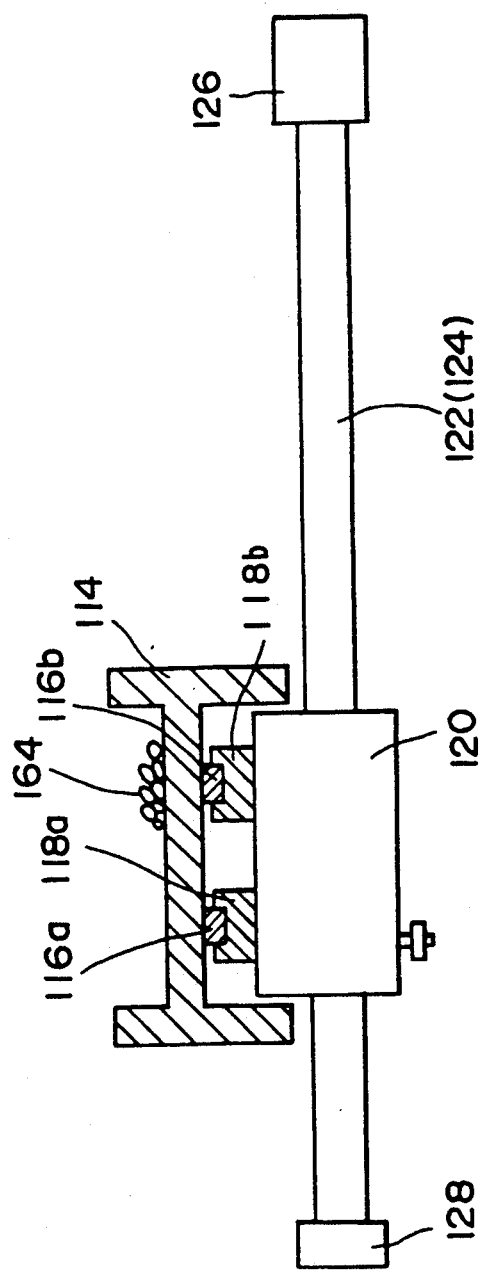

As shown in FIG. 18, the mounting block 114 has an H-shaped cross section. A pair of parallel guide rails 116a and 116b are mounted on the front surface of the mounting block 114 to extend in the vertical direction. A vertical moving block 120 is vertically slidably mounted on the pair of guide rails 116a and 116b through slide bearings 118a and 118b on the mounting block 114. A pair of upper and lower parallel horizontal shafts 122 and 124 are mounted as lateral guides in the vertical moving block 120 through slide bushes (not shown) and extend in the horizontal direction to be slidable therealong. The horizontal shafts 122 and 124 comprises hollow shafts, respectively.

A hollow horizontal moving block 126 is fixed to one end of each of the horizontal shafts 122 and 124, and the other end of each of the shafts 122 and 124 is fixed to a hollow connecting block 128. In this manner, the horizontal shafts 122 and 124, the horizontal moving block 126, and the connecting block 128 can be horizontally moved together. That is, in this embodiment, the horizontal shafts 122 and 124 serve as R axes of the cylindrical robot. A finger 132 is mounted below the horizontal moving block 126 through a Z shaft 130 extending along a vertical axis. The Z shaft 130 is pivotal about its own axis through a rotary driving motor (not shown) arranged in the horizontal moving block 126. The Z shaft 130 is pivotal between a vertical position (FIG. 17) and a horizontal position extending along a horizontal axis (not shown) about a pivot shaft 126b mounted on a support block 126a fixed in the horizontal moving block 126. The finger 132 grips a work W in a well-known arrangement, and a detailed description thereof will be omitted.

A driving mechanism 134 for moving the finger 132 to an arbitrary position within the vertical plane shown in FIG. 17 will be described below.

As shown in FIG. 17, the driving mechanism 134 comprises toothed driving pulleys 136 and 138 respectively mounted on the upper and lower end faces of the mounting block 114, driving motors 144 and 146 for rotating the driving pulleys 136 and 138 through endless belts 140 and 142, respectively, first, second, third, and fourth idle pulleys 148, 150, 152, and 154 rotatably supported at positions corresponding to the four corners of a rectangle on the surface of the vertical moving block 126, and a fifth toothed idle pulley 156 rotatably mounted on the connecting block 128. The driving mechanism 134 further comprises a timing belt 160, both surfaces of which are toothed, one end of which is fixed to the upper portion of a fixing block mounted on the horizontal moving block 126 and the other end of which is fixed to the lower portion of a fixing block 158. The timing belt 160 is looped through the first idle pulley 148, the first driving pulley 136, the second idle pulley 150, the fifth idle pulley 156, the third idle pulley 152, the second driving pulley 138, and the fourth idle pulley 154.

Since the driving mechanism 134 is arranged as described above, when the first and second driving motors 144 and 146 are driven to rotate the corresponding first and second driving pulleys 136 and 138 clockwise, the vertical moving block 120 is moved downward. Therefore, the finger 132 is moved downward. On the other hand, when the first and second driving motors 144 and 146 are driven to rotate the corresponding first and second driving pulleys 136 and 138 counterclockwise the vertical moving block 120 is moved upward. In this case, the finger 132 is moved upward. When the first and second motors 144 and 146 are driven to rotate the corresponding first and second driving pulleys 136 and 138 counterclockwise and clockwise, respectively, the vertical moving block 120 is kept at the present position, but the horizontal moving block 126 is moved to the left. Therefore, the finger 132 is moved to the left. When the first and second driving motors 144 and 146 are driven to rotate the corresponding first and second driving pulleys 136 and 138 clockwise and counterclockwise, respectively, the vertical moving block 120 is kept at the present position, but the horizontal moving block 126 is moved to the right. Therefore, the finger 132 is moved to the right.

As described above, since the mounting block 114 is pivoted about a vertical axis, the finger 132 is moved to an arbitrary position around the center of the base 112.

A wiring and piping scheme of the finger 132 as a characteristic feature of the present invention in the cylindrical robot 110 having the above structure will be described below.

In this embodiment, the finger 132 comprises a pneumatically operated mechanism portion and an electrically controlled mechanism portion. For this reason, the finger 132 is connected through wiring/piping 164 to a control unit 162 arranged outside the cylindrical robot 110. Note that the control unit 162 includes a CPU for controlling the overall operation of the robot, and pneumatic and electrical control portions operated under the control of the CPU.

A flexible duct 166 is arranged to allow the wiring/piping 164 to extend therethrough. One end of the duct 166 is spaced apart from the upper surface of the mounting block 114 by a predetermined distance through a mounting stay 168. The other end of the duct 166 is directly connected to the connecting block 128 while the duct 166 communicates with the internal space of the connecting block 128. The wiring/piping 164 is guided as will be described with reference to FIG. 19 and causes the control unit 162 to communicate with the finger 132.

Figure 19:
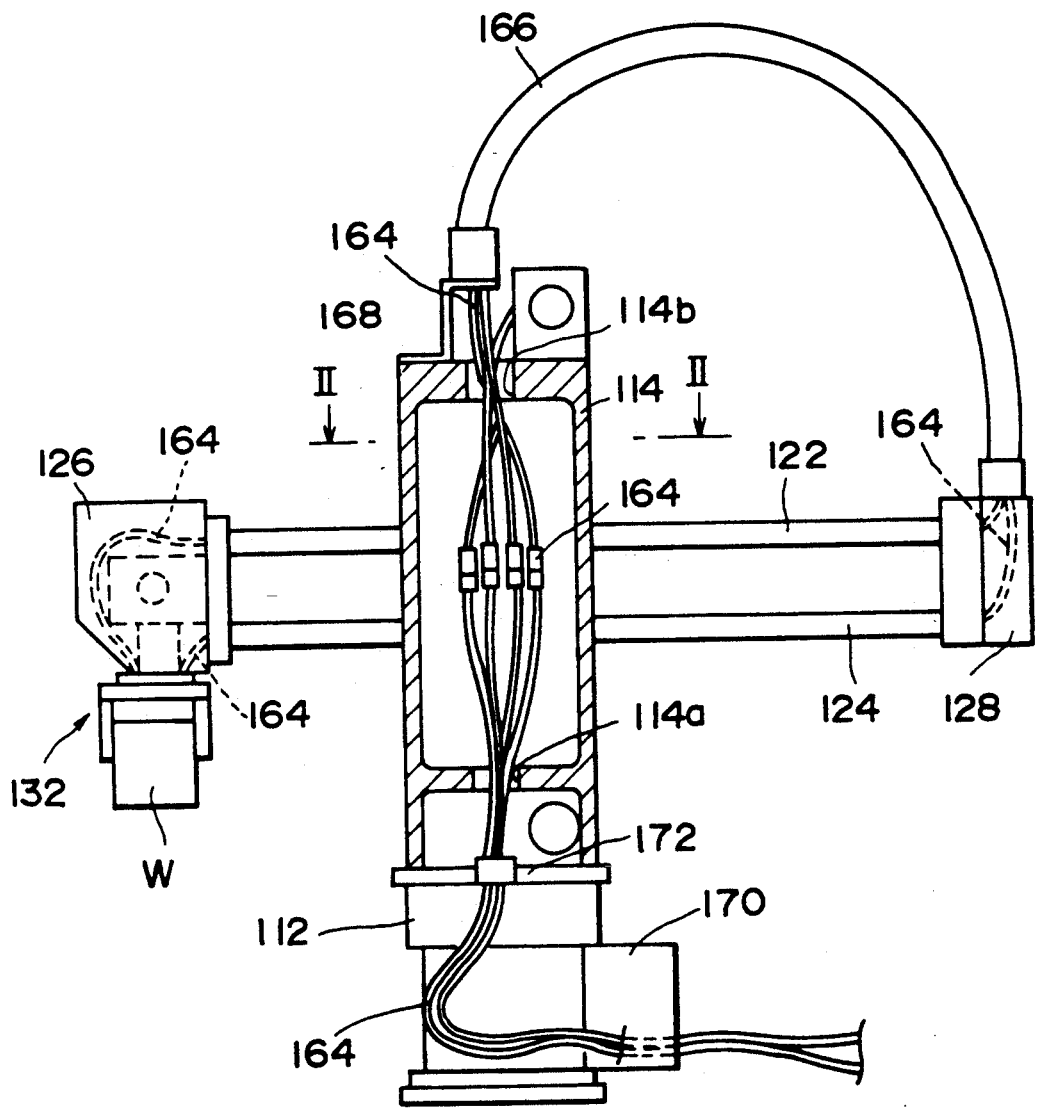

The wiring/piping 164 extending from the control unit 162 is locked by a base cover 170 mounted on the lower side surface of the base 112 and is guided to the rear surface side of the base 112. As shown in FIG. 19, the wiring/piping 164 is locked by a locking hook 172 mounted in the lower portion of the mounting block 114 and is guided to the rear surface side of the mounting block 114 through a lower opening 114a of the mounting block 114. The wiring/piping 164 is guided along the rear surface. The wiring/piping 164 is temporarily extracted above the mounting block 114 through an upper opening 114b and is received in the duct 166 from its one end. The wiring/piping 164 is then guided in to the connecting block 128 through the other end of the duct 166. The wiring/piping 164 is divided into two parts in the connecting block 128. One part is guided in the horizontal moving block 126 through the upper horizontal shaft 122, and the other part is guided in the horizontal moving block 126 through the lower horizontal shaft 124. The two parts are connected to the finger 132 located at the lower end of the horizontal moving block 126 through the Z shaft 130.

By guiding the wiring/piping 164 as described above, two-axis movements of the vertical and horizontal shafts of the finger 132 can be absorbed by one portion, i.e., the duct 166. In this manner, the structure of the wiring/piping 164 which can absorb the movements of the finger 132 can be simplified, and the manufacturing cost can be reduced.

One end of the duct 166 which receives the wiring-/piping 164 is connected to the upper end of the mounting block. The other end of the duct 166 is connected to the other end opposite to one end (of each of the horizontal shafts 122 and 124) mounted with the finger 132. As a result, if a space for receiving the finger 132 is available, the duct 166 is located at a position symmetrical about the mounting block 114 from the finger 132. Interference of the finger 132 with a machine tool or the like can be perfectly eliminated. Therefore, the work W can be attached or detached in a narrow space in a state where the presence of the duct 166 need not be taken into consideration.

The mounting block 114 is arranged to have an H-shaped horizontal section. This structure can enhance rigidity of the mounting block against a rotational moment upon rotation of the mounting block 114. The vertical moving block 120 can be mounted on the surface of a compact arrangement, and a special duct for the wiring/piping 164 need not be arranged on the rear surface, but the space for guiding the wiring/piping can be assured, thereby reducing the cost.

This effect will be described in more detail with reference to FIG. 20.

Figure 20:
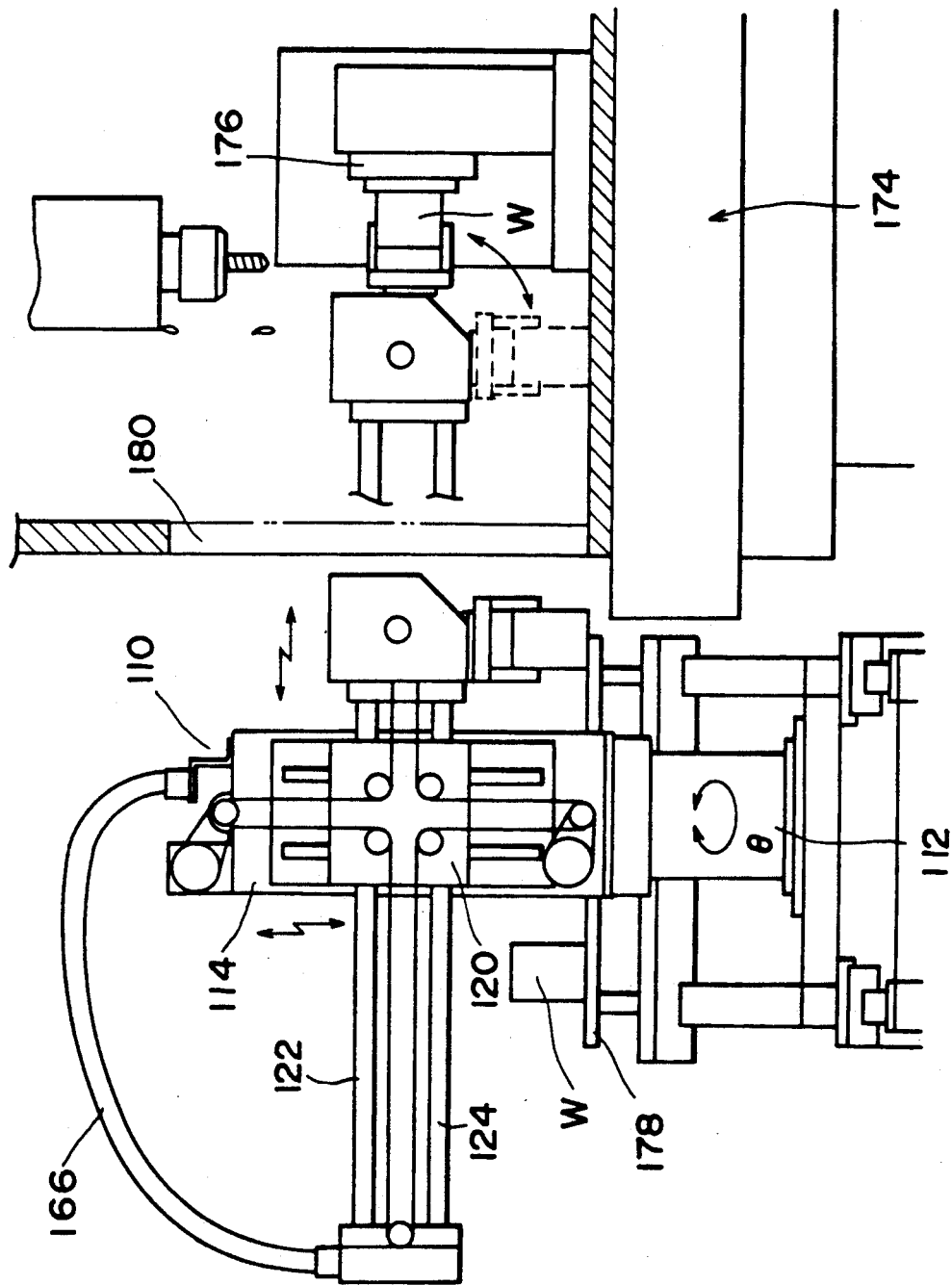

FIG. 20 shows an operation in which a work W is attached to or detached from a mounting jig 176 of an NC milling machine 174 serving as a machine tool using the cylindrical robot 110 described above. In this cylindrical robot 110, the driving mechanism 134 is driven to move the finger 132 immediately above a magazine 178, and the finger 132 is controlled and driven to pick up the work W from the magazine 178. The driving mechanism 134 is driven again to move the finger 132 into the NC milling machine 174 through a narrow opening formed by opening a door 180. The finger 132 is appropriately rotated about the shaft 126b to mount the work W in the mounting jig 176. When milling of the work W attached to the mounting jig 176 is completed, the cylindrical robot 110 performs operations in a reversed order, thereby returning the worked work W in the magazine 178.

In these operations of the cylindrical robot 110, the finger 132 is moved in the NC milling machine 174 through the door 180. However, if the other end of the duct 166 is connected to the upper surface of the horizontal moving block 126 located immediately above the finger 132 as in the conventional structure, interference of the duct 166 with the NC machine tool must be taken into consideration when it passes through the narrow opening. If the opening is small to cause interference of the duct 166 with the opening edge, a large force acts on the duct due to the interference of the duct 166 with the opening edge. As a result, the duct 166 may be damaged.

In this embodiment, however, when the finger 132 is to be inserted into the NC milling machine 174, the duct 166 is completely located outside the NC milling machine 174 and does not interfere with the opening edge of the NC milling machine 174. As a result, no consideration need be made for interference of the duct 166 with the opening.

On the other hand, since a large amount of lubricant oil is used within the NC milling machine 174, even if the finger 132 and the duct 166 are inserted into the NC milling machine 174 without causing the duct 166 to interfere with the opening, the duct 166 may be contaminated and with oil. If the duct 166 is made of, e.g., rubber, the duct 166 is deteriorated by the oil, thereby degrading durability and reliability of the duct 166.

In this embodiment, however, since the duct 166 is not inserted into the NC milling machine 174, contamination with the oil can be perfectly eliminated, and the durability and reliability can be improved.

Figure 24:
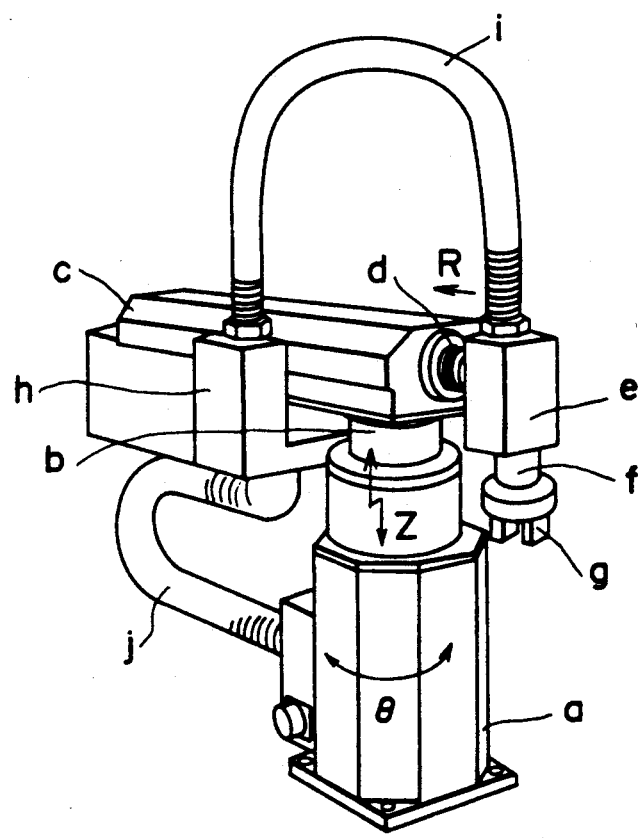

According to this embodiment, the duct 166 is connected to ends of the horizontal shafts 122 and 124 at positions opposite to the ends to which the finger is attached, and dynamic characteristics at the distal end of the finger mounting side, and particularly, vibrations can be suppressed. That is, in the mounted state of FIG. 24 in the conventional arrangement, when a vertical shaft b is rotated about the vertical axis, a first connecting pipe i is swung, and the vibrations of a finger g are increased. In this embodiment, however, when the mounting block 14 is rotated and driven about a vertical axis, the duct 166 is also swung. Since the duct 166 is not connected to the finger mounting side and since vibrations of the duct 166 itself are reduced due to a decrease in length between the mounting position of the duct 166 and the vertical axis at the outermost positions of the horizontal shafts 122 and 124 most susceptible to vibrations, the vibrations of the finger 132 can be minimized.

The present invention is not limited to the particular embodiment described above. Various changes and modifications may be made without departing from the spirit and scope of the invention.

According to the present invention, for example, the mounting block 114 has an H-shaped horizontal section. However, the present invention is not limited to this. The mounting block 114 may be made of a flat member or a hollow housing.

In the above embodiment, the lateral guides comprise the pair of horizontal shafts 122 and 124 to cause the mounting block 114 to extend in the vertical direction. However, the present invention is not limited to this. For example, the mounting block 114 may extend in a direction perpendicular to the extension direction of the horizontal shafts 122 and 24, and the mounting block 114 may be vertically movably supported.

In the embodiment described above, the industrial robot according to the present invention comprises a cylindrical robot. However, the present invention is not limited to this. As still another embodiment shown in FIG. 21, a robot can be arranged as a three-axis independent robot in which the robot can be moved in three orthogonal axes. The same reference numerals as in the above embodiment denote the same parts in this embodiment, and a detailed description thereof will be omitted.

Figure 21:
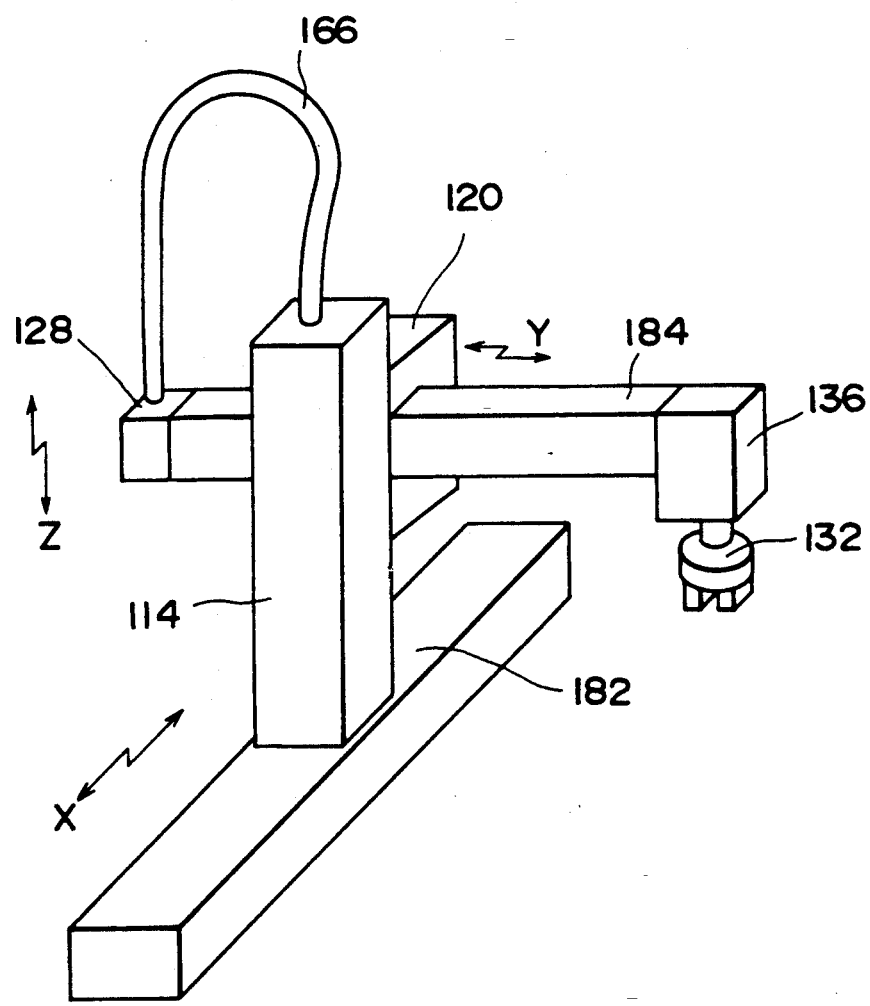
FIG. 21 is a perspective view showing an arrangement of an industrial robot applied to an orthogonal robot according to still another embodiment of the present invention.
Figure 22:
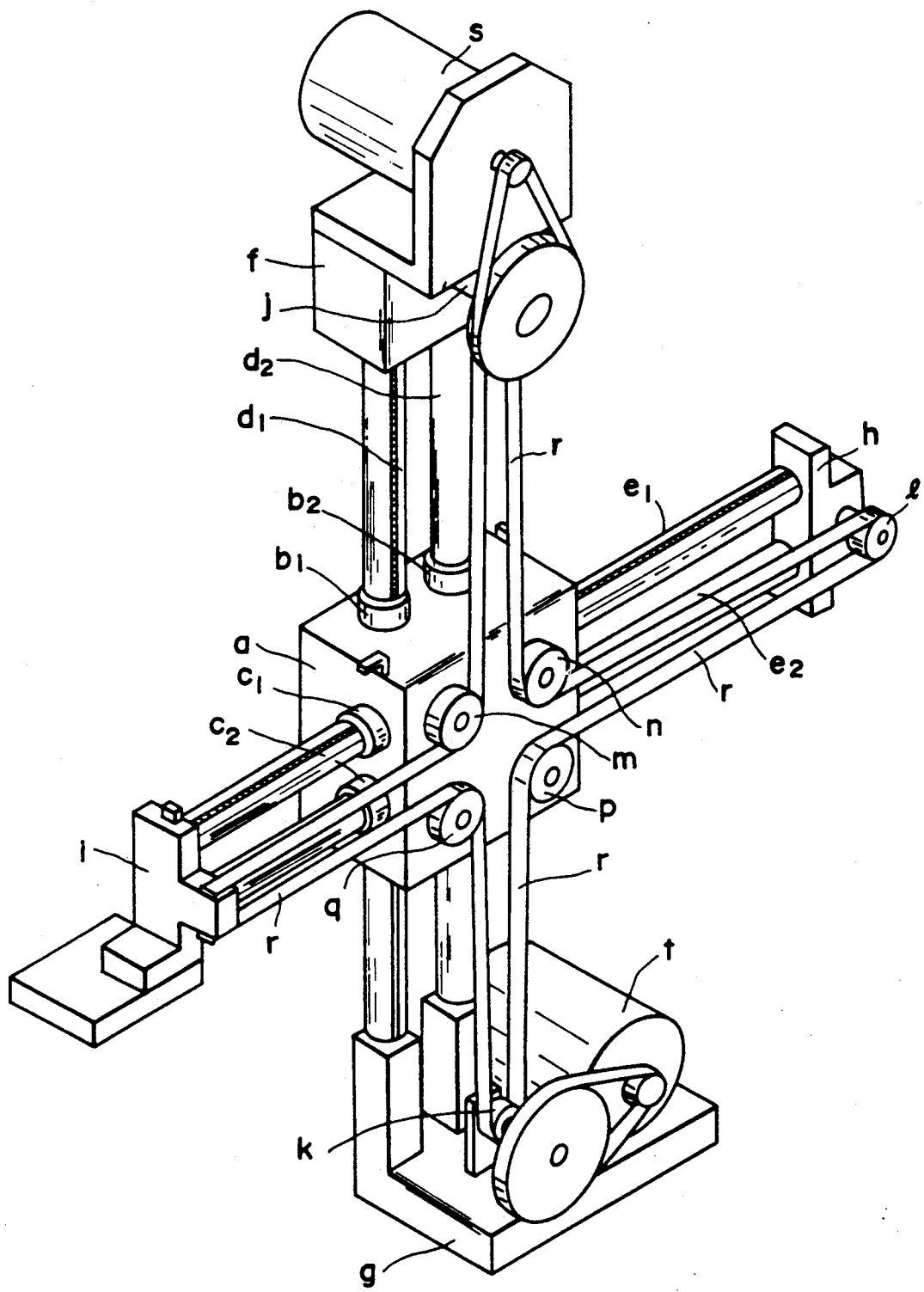
FIGS. 22 to 24 are views for explaining conventional examples corresponding to the objects of the present invention.

In the embodiment of FIG. 21, a mounting block 114 is mounted on a slide rail 182 extending in a direction perpendicular to the extension direction of the mounting block 114 and is slidable in the extension direction of the slide rail 182. In the embodiment of FIG. 21, unlike in the above embodiment, the lateral guide comprises a single hollow shaft 184 having a rectangular section.

As has been described in detail above, there is provided an industrial robot comprising a lateral guide having a finger at one end thereof and movable along a lateral direction, a movable block, movable along a longitudinal direction, for laterally movably supporting the lateral guide, a mounting block extending along the longitudinal direction, guide means for movably guiding the movable block in the longitudinal direction, driving means for rotating or moving the mounting block, and wiring means for controlling to drive the finger, the wiring means having a flexible pipe for connecting an upper end of the mounting block and the other end of the lateral guide and wiring extending through the pipe along the lateral guide and connected to the finger.

In the industrial robot according to the present invention, the mounting block is hollow, and the wiring extends outside the mounting block from its lower end.

In the industrial robot according to the present invention, the lateral guide is hollow, and the wiring is inserted from the other end of the lateral guide and is connected to the finger therethrough.

According to the present invention, therefore, there is provided an industrial robot wherein a connecting pipe into which wiring to be connected to the finger is inserted is arranged not to interfere with attachment-/detachment of an article in a narrow space.

According to the present invention, there is also provided an industrial robot capable of preventing degradation of the connecting pipe into which wiring to be connected to the finger is inserted.

What is claimed is:

1. An orthogonal two-axis moving apparatus comprising:
   a base;
   a first block member mounted on said base;
   driving force transmitting means mounted on said first block member;
   a first slide shaft supported by said first block member and reciprocating in a horizontal direction;
   first driven means mounted on one end of said first slide shaft;
   a guide block member mounted on the other end of said first slide shaft;
   a second slide shaft supported by said guide block member and movable in a vertical direction,
      said slide shafts having two ends mounted with second and third driven means; and
   means for moving said second slide shaft in the horizontal and vertical directions and a direction oblique to the horizontal direction,
      said moving means having:
         a driving source for transmitting a driving force to said driving force transmitting means, and
         a transmission member for transmitting the driving force from said driving force transmitting means to said first, second, and third driven means.

2. An orthogonal two-axis moving apparatus comprising:
   a base;
   a first block member mounted on said base,
      said first block member having first and second driving members;
   a first slide member supported by said first block member and movable in a horizontal direction,
      said first slide member having first driven means at one end thereof and a guide block member at the other end thereof;
   a second slide member supported by said guide block member and movable in the vertical direction,
      said second slide member having two ends mounted with second and third driven means; and
   means for moving said second slide member in the horizontal and vertical directions,
      said moving means having:
         driving means for driving said first and second driving members capable of switching driving directions thereof to two directions, and
         a transmission member, connected to said first and second driving members and said first, second, and third driven means, for transmitting driving forces in the horizontal and vertical directions of said second slide member in accordance with the switching of the driving direction of said first and second driving members.

3. An apparatus according to claim 2, wherein said first and second driving members respectively comprise first and second driving pulleys spaced apart from each other in the vertical direction and mounted on said first block member,
   said first driven means comprises a driven pulley,
   said second and third driven means comprise driven pulleys, respectively;
   said driving means comprises means for rotating said first and second driving pulleys in clockwise and counterclockwise directions,
   said transmission member comprises a belt member looped around said first driving pulley, said driven pulleys, and said second driving pulley, and
   a length of said belt member looped between said first driving pulley and said second driven means is changed to move said second slide member in the vertical or horizontal direction.

4. An apparatus according to claim 3, further comprising means for rotating said first block member.

5. An apparatus according to claim 3, further comprising working means for working and assembly, mounted on said second slide shaft.

6. An orthogonal two-axis moving apparatus comprising:
   a first block member,
      said first block member having first and second driving pulleys;

a first horizontal slide member supported by said first block member and movable in a horizontal direction,
said first horizontal slide member having a first driven pulley at one end thereof;
a slide guide member located at the other end of said first horizontal slide member and mounted to extend in the vertical direction,
said slide guide member having two ends respectively mounted with driven pulleys;
a vertical slide member slidable with respect to said slide guide member; and
a transmission belt looped around said first and second driving pulleys and said driven pulleys.

7. An apparatus according to claim 6, further comprising working means for a working or assembly operation, mounted on said slide member.

8. An orthogonal two-axis moving apparatus comprising:
a vertical block member,
said vertical block member having first and second driving pulleys spaced apart from each other in a vertical direction;
a horizontal moving member supported by said vertical block member and movable in a horizontal direction,
said horizontal moving member having two ends respectively mounted with first and second driven pulleys;
means for driving said first and second driving pulleys;
a belt member looped around said first and second driving pulleys and said first and second driven pulleys;
working means, operated in response to an external control signal, for performing a working or assembly operation, said working means being mounted on one end of said horizontal moving member; and
means for outputting the control signal,
wherein the control signal output from said outputting means is transmitted through a signal transmission member arranged from one end of said horizontal moving member to the other end of said horizontal moving member whereon said working means is mounted.

9. An apparatus according to claim 8, wherein said horizontal moving member comprises a hollow member, and said signal transmission member is arranged inside said hollow member.

10. An orthogonal two-axis moving apparatus comprising:
a first block;
a first slide member extending along a first axis and mounted on said first block to be movable along the first axis;
a second block fixed on one end of said first slide member;
a third block fixed to the other end of said first slide member;
a second slide member extending along a second axis perpendicular to the first axis and mounted on said second block to be movable along the second axis;
first and second driving rotary members pivotally supported on said first block;
first and second driving motors, respectively, connected to said first and second driving rotary members to rotate said first and second driving rotary members reversibly;
first and second idle rotary members pivotally mounted on two ends of said second slide member;
a third idle rotary member pivotally mounted on said third block;
a belt, one end and the other end of which are fixed on said second block, and an intermediate portion of which is sequentially engaged with said first idle rotary member, said first driving rotary member, said third idle rotary member, said second driving rotary member, and said second idle rotary member; and
brake means for arbitrarily stopping rotation of said third idle rotary member;
wherein rotational direction of said first and second driving motors are fixed to predetermined directions to move said second slide member along the first and second axes.

11. An orthogonal two-axis moving apparatus comprising:
a first block;
a first slide member extending along a first axis and mounted on said first block to be movable along the first axis;
a second block fixed on one end of said first slide member;
a third block fixed to the other end of said first slide member;
a second slide member mounted on said second block to be movable along a second axis perpendicular to the first axis;
first and second driving rotary members pivotally supported on said first block;
first and second driving motors, respectively, connected to said first and second driving rotary members to rotate said first and second driving rotary members reversibly;
first and second idle rotary members pivotally mounted on two ends, along the second axis, of said second slide member;
a third idle rotary member pivotally mounted on said third block;
a belt, one end and the other end of which are fixed on said second slide member, and an intermediate portion of which is sequentially engaged with said first idle rotary member, said first driving rotary member, said third idle rotary member, said second driving rotary member, and said second idle rotary member; and
brake means for arbitrarily stopping rotation of said third idle rotary member,
wherein rotational directions of said first and second driving motors are fixed to predetermined directions to move said second slide member along the first and second axes.

12. An orthogonal two-axis moving apparatus comprising:
a first block;
a first slide member extending along a first axis and mounted on said first block to be movable along the first axis;
a second block fixed on one end of said first slide member;
a third block fixed to the other end of said first slide member;
a second slide member extending along a second axis perpendicular to the first axis, mounted on said second block to be moveable along the second axis, and having gripping means for gripping an article;

first and second driving rotary members pivotally supported on said first block;

first and second driving motors, respectively, connected to said first and second driving members to rotate said first and second driving rotary members reversibly;

first and second idle rotary members pivotally mounted on two ends of said second slide member;

a third idle rotary member pivotally mounted on said third block;

a belt, one end and the other end of which are fixed on said second block, and an intermediate portion of which is sequentially engaged with said first idle rotary member, said first driving rotary member, said third idle rotary member, said second driving rotary member, and said second idle rotary member;

storing means for storing a teaching point of said gripping means;

brake means for arbitrarily stopping rotation of said third idle rotary member;

detecting means for detecting rotation amounts of said first and second driving motors; and arithmetic means for calculating a moving position of said gripping means on the basis of the rotation amounts of said first and second driving motors which are detected by said detecting means, wherein at a time of updating of the teaching point of said gripping means in said storing means, said gripping means is manually moved to a new teaching point in power-off states of said first and second driving motors, and the teaching point in said storing means is updated by an arithmetic result of the moving position by said arithmetic means.

13. An orthogonal two-axis moving apparatus comprising:

a first block;

a first slide member extending along a first axis and mounted on said first block to be movable along the first axis;

a second block fixed on one end of said first slide member;

a third block fixed to the other end of said first slide member;

a second slide member mounted on said second block to be movable along a second axis perpendicular to the first axis, and having gripping means for gripping an article;

first and second driving rotary member pivotally supported on said first block;

first and second driving motors, respectively, connected to said first and second driving rotary members to rotate said first and second driving rotary members reversibly;

first and second idle rotary members pivotally mounted on two ends, along the second axis, of said second block;

a third idle rotary member pivotally mounted on said third block;

a belt, one end and the other end of which are fixed on said second slide member, and an intermediate portion of which is sequentially engaged with said first idle rotary member, said first driving rotary member, said third idle rotary member, said second driving rotary member, and said second idle rotary member; and brake means for arbitrarily stopping rotation of said third idle rotary member, said apparatus further comprising:

detecting means for detecting rotation amounts of said first and second driving motors; and arithmetic means for calculating a moving position of said gripping means on the basis of the rotation amounts of said first and second driving motors which are detected by said detecting means, wherein at a time of updating of the teaching point of said gripping means in said storing means, said gripping means is manually moved to a new teaching point in power-off states of said first and second driving motors, and the teaching point in said storing means is updated by an arithmetic result of the moving position by said arithmetic means.

* * * * *

UNITED STATES PATENT AND TRADEMARK OFFICE
CERTIFICATE OF CORRECTION

PATENT NO. : 5,198,736

DATED : March 30, 1993

INVENTOR(S) : Yusaku Azuma, et al.

It is certified that error appears in the above-identified patent and that said Letters Patent is hereby corrected as shown below:

<u>COLUMN 1</u>
  Line 31, "g" should read --q--;
  Line 33, "g" should read --q--.

<u>COLUMN 3</u>
  Line 4, "driving" should be deleted.

<u>COLUMN 14</u>
  Line 14, "are" should read --can be--.

<u>COLUMN 15</u>
  Line 33, "driving" should read --idle--.

<u>COLUMN 21</u>
  Line 1, "24," should read --124,--.

<u>COLUMN 22</u>
  Line 32, "to" should read --between--.

<u>COLUMN 26</u>
  Line 9, "member" should read --members--.

Signed and Sealed this

Twenty-second Day of February, 1994

*Attest:*

BRUCE LEHMAN

*Attesting Officer*     *Commissioner of Patents and Trademarks*